United States Patent [19]

Ueda et al.

[11] Patent Number: 5,753,769
[45] Date of Patent: May 19, 1998

US005753769A

[54] PROCESS FOR PREPARING PROPYLENE POLYMER COMPOSITION AND PROPYLENE POLYMER COMPOSITION

[75] Inventors: Takashi Ueda; Mikio Hashimoto; Masaaki Kawasaki; Daisuke Fukuoka; Junichi Imuta, all of Yamaguchi, Japan

[73] Assignee: Mitsui Petrochemical Industries, Ltd., Tokyo, Japan

[21] Appl. No.: 448,569

[22] PCT Filed: Apr. 11, 1995

[86] PCT No.: PCT/JP95/00708

§ 371 Date: Jun. 7, 1995

§ 102(e) Date: Jun. 7, 1995

[87] PCT Pub. No.: WO95/27741

PCT Pub. Date: Oct. 19, 1995

[30] Foreign Application Priority Data

Apr. 11, 1994 [JP] Japan ................. 6-072297
Apr. 11, 1994 [JP] Japan ................. 6-072308

[51] Int. Cl.$^6$ .............. C08F 10/06; C08F 4/60; C08F 297/06; C08L 23/14
[52] U.S. Cl. .............. 525/323; 525/247; 526/351
[58] Field of Search ................. 525/323, 247; 526/351

[56] References Cited

U.S. PATENT DOCUMENTS

| | | | |
|---|---|---|---|
| 4,245,062 | 1/1981 | Suzuki | 525/323 |
| 4,337,326 | 6/1982 | Shiga | 525/244 |
| 4,550,145 | 10/1985 | Kasahara | 525/267 |
| 4,910,262 | 3/1990 | Fujii | 525/323 |
| 4,990,640 | 2/1991 | Tsutsui et al. | |
| 5,155,080 | 10/1992 | Elder et al. | |
| 5,225,500 | 7/1993 | Elder et al. | |
| 5,232,993 | 8/1993 | Winter et al. | 525/247 |
| 5,280,074 | 1/1994 | Schreck et al. | 525/240 |
| 5,321,106 | 6/1994 | LaPointe | |
| 5,322,902 | 6/1994 | Schreck et al. | 525/247 |
| 5,326,639 | 7/1994 | Leonard | 428/402 |
| 5,330,948 | 7/1994 | Marks | 502/104 |
| 5,336,746 | 8/1994 | Tsutsui | 526/348.6 |
| 5,350,817 | 9/1994 | Winter | 526/119 |
| 5,352,520 | 10/1994 | Katajima | 428/402 |
| 5,387,568 | 2/1995 | Ewen et al. | |
| 5,391,629 | 2/1995 | Turner | 525/268 |
| 5,416,178 | 5/1995 | Winter | 526/160 |
| 5,416,228 | 5/1995 | Ewen | 556/7 |
| 5,453,466 | 9/1995 | Pellegatti | 525/240 |
| 5,504,172 | 4/1996 | Imuta | 526/351 |

FOREIGN PATENT DOCUMENTS

| | | |
|---|---|---|
| 0041361 | 7/1985 | European Pat. Off. |
| 0426638 | 5/1991 | European Pat. Off. |
| 0427697 | 5/1991 | European Pat. Off. |
| 4-337308 | 11/1992 | Japan. |
| WO88 05792 | 8/1988 | WIPO. |
| WO88 05793 | 8/1988 | WIPO. |

*Primary Examiner*—Irina S. Zemel
*Attorney, Agent, or Firm*—Sherman and Shalloway

[57] ABSTRACT

A process for preparing a propylene polymer composition having excellent rigidity, heat resistance and impact resistance comprising conducting multistage polymerization including a step (a) for preparing a propylene (co)polymer (A), a step (b) for preparing a propylene-olefin copolymer (B) and a step (c) for preparing an ethylene-olefin copolymer (C) in the presence of (I) a transition metal compound and (II) a compound activating the transition metal compound (I), in which the steps (a), (b) and (c) are carried out in any order, each of the second and subsequent stage polymerizations is carried out in the presence of a polymer or polymers obtained by the preceding stage or stages, respectively, and the resulting propylene polymer composition contains the propylene (co)polymer (A) in an amount of 20 to 90% by weight, the propylene-olefin copolymer (B) in an amount of 5 to 75% by weight and the ethylene-olefin copolymer (C) in an amount of 5 to 75% by weight, and has MFR, as measured at 230° C. under a load of 2.16 kg, of 0.01 to 500 g/10 min.

7 Claims, 2 Drawing Sheets

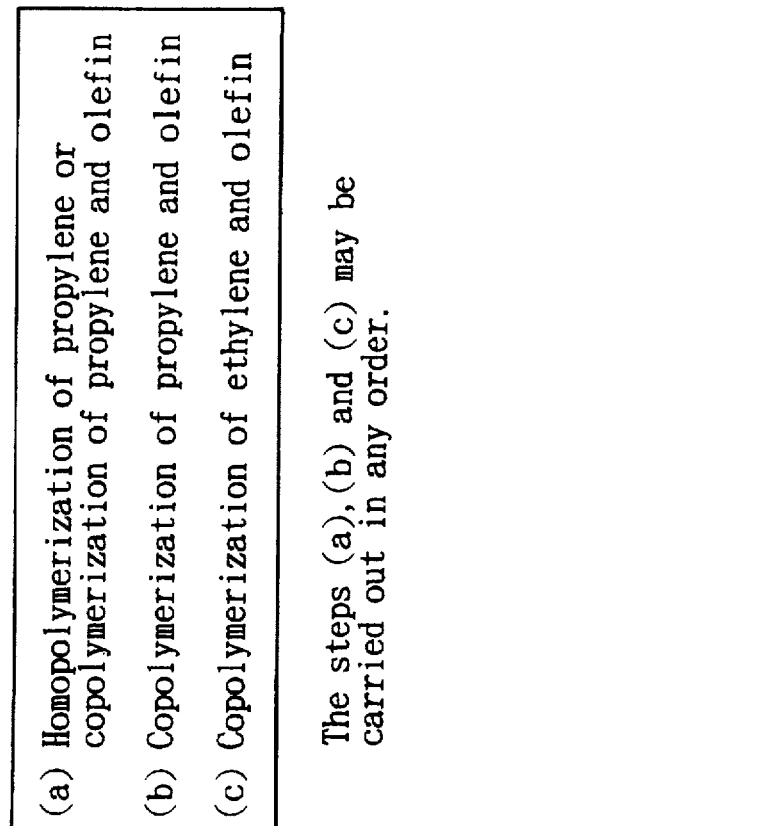

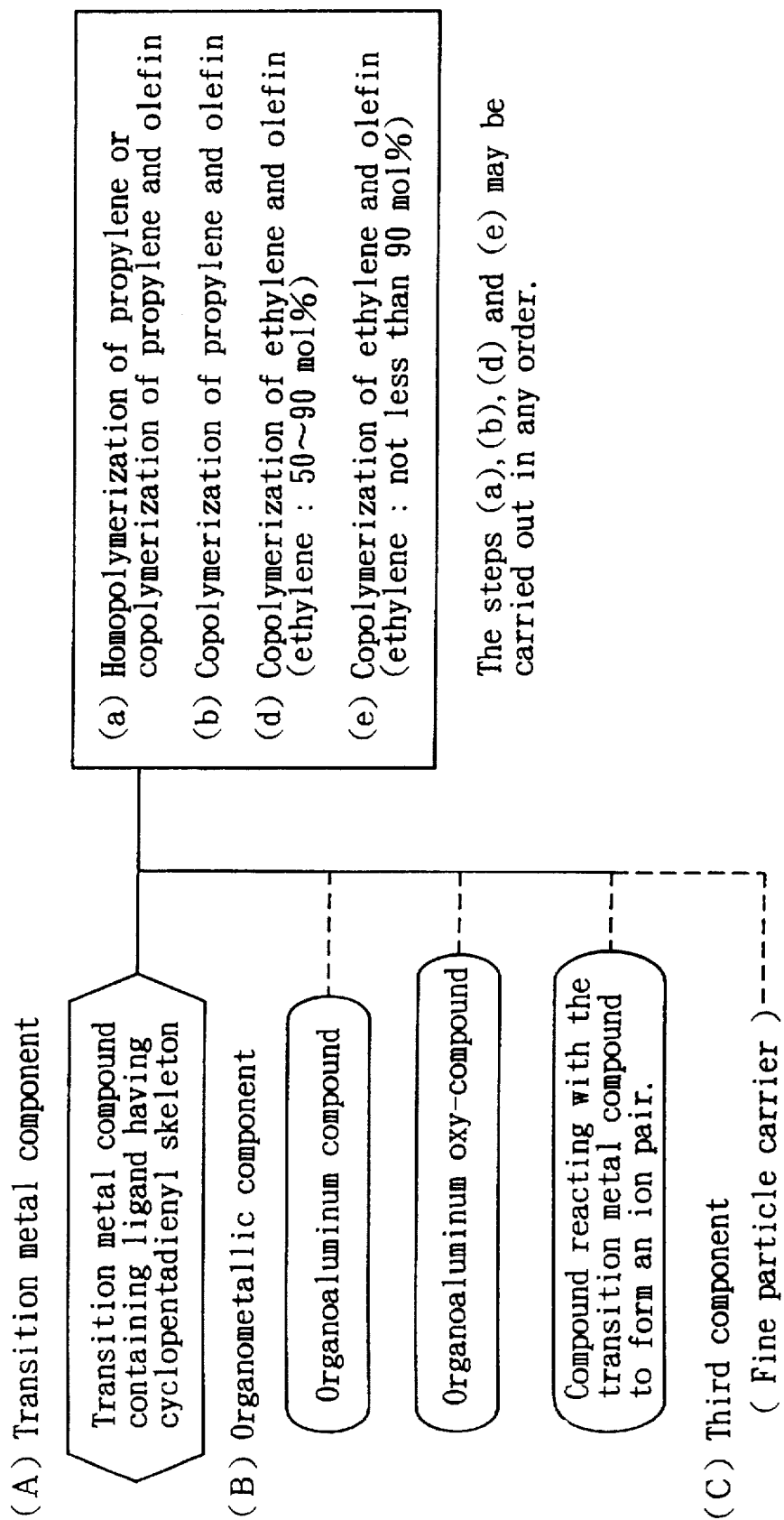

5,753,769

PROCESS FOR PREPARING PROPYLENE POLYMER COMPOSITION AND PROPYLENE POLYMER COMPOSITION

This application is the national phase entry, under 35 USC §371, of International Application No. PCT/JP95/00708, filed Apr. 11, 1995.

FIELD OF THE INVENTION

The present invention relates to a process for preparing a propylene polymer composition, and a propylene polymer composition prepared by the process, more particularly to a process for preparing a propylene polymer composition using multistage polymerization and a propylene polymer composition prepared by such process.

BACKGROUND OF THE INVENTION

Because of their excellent rigidity, heat resistance and impact resistance, propylene polymers are used for various molded articles in many fields.

For further improving the impact resistance of propylene polymers, there is known a process comprising initially homopolymerizing propylene and then copolymerizing propylene and ethylene to prepare a block copolymer.

For example, Japanese Patent Laid-Open Publication No. 337308/1992 discloses a process for preparing a block copolymer in which propylene is first homopolymerized or copolymerized with ethylene in the presence of a transition metal compound having as a ligand a cyclopentadienyl bridged with a silylene group and an organoaluminum compound so as to produce a propylene homopolymer or a propylene copolymer containing less than 6% by weight of ethylene, in an amount of 40 to 95% by weight based on the total weight of the final polymer product; and then ethylene and propylene in a weight ratio of 10/10 to 95/5 are further copolymerized in the presence of the same transition metal compound and the same organoaluminum compound until a copolymer is produced in an amount of 60 to 5% by weight based on the total weight of the final polymer product. This publication also describes that the block copolymer obtained by this process has well balanced properties between impact resistance and rigidity.

Japanese Patent Laid-Open Publication No. 202152/1993 discloses a process for preparing a polypropylene molding material comprising (1) 20 to 99% by weight of a crystalline polymer having a propylene unit content of not less than 95% by weight and (2) 1 to 80% by weight of a non-crystalline ethylene-propylene copolymer having an ethylene unit content of 20 to 90% by weight, in the presence of a catalyst comprising a transition metal compound and an organoaluminum compound, in which polymerization to prepare the non-crystalline ethylene-propylene copolymer is carried out using a specific bridged metallocene compound and aluminoxane. This publication also describes that the polypropylene molding material obtained by this process has excellent properties, particularly in low-temperature impact strength.

However, there has recently been an increasingly severe demand for properties of polypropylene compositions. In addition, there has also been a need for a propylene polymer composition having well balanced properties among rigidity, heat resistance and impact resistance, and a process capable of preparing such composition.

DESCRIPTION OF THE INVENTION

The first process for preparing a propylene polymer composition according to the invention comprises:

conducting multistage polymerization including the following steps (a), (b) and (c) in the presence of
  (A) a transition metal compound containing a ligand having a cyclopentadienyl skeleton and
  (B) a compound activating the transition metal compound (A), in which the steps (a), (b) and (c) may be carried out in any order, and each of the second and subsequent stage polymerizations is carried out in the presence of a polymer or polymers obtained in the preceding stage or stages, respectively, to produce a propylene polymer composition comprising 20 to 90% by weight of a propylene (co)polymer (a) obtained in the step (a), 5 to 75% by weight of a propylene/olefin copolymer (b) obtained in the step (b) and 5 to 75% by weight of an ethylene/olefin copolyemr obtained in the step (c), said composition having a melt flow rate, as measured at 230° C. under a load of 2.16 kg, of 0.01 to 500 g/10 min;

the step (a):
  (i) homopolymerizing propylene or (ii) copolymerizing propylene and at least one olefin selected from ethylene and olefins of 4 to 20 carbon atoms to prepare a propylene (co)polymer (a) comprising not less than 80 mol % of constituent units derived from propylene, said propylene (co)polymer (a) having a melting point, as measured by a differential scanning calorimeter, of not lower than 100° C. and a melt flow rate, as measured at 230° C. under a load of 2.16 kg, of 0.01 to 1,000 g/10 min;

the step (b):
  copolymerizing propylene and at least one olefin selected from ethylene and olefins of 4 to 20 carbon atoms to prepare a prpylene/olefin copolymer (b) comprising more than 50 mol % of constituent units derived from propylene, said propylene/olefin copolymer (b) having an intrinsic viscosity [η], as measured in decalin at 135° C., of 0.1 to 20 dl/g; and the step (c):
  copolymerizing ethylene and at least one olefin selected from olefins of 3 to 20 carbon atoms to prepare an ethylene/olefin copolymer (c) comprising more than 50 mol % of constituent units derived from ethylene, said ethylne/olefin copolymer (c) having an intrinsic viscosity [η], as measured in decalin at 135° C., of 0.1 to 20 dl/g.

According to the invention, preferably the multistage polymerization is carried out in the order of the step (a), the step (b) and the step (c).

Further, it is preferred that propylene is homopolymerized in the step (a), propylene is copolymerized with ethylene or 1-butene in the step (b), and ethylene is copolymerized with an olefin in the step (c).

In the present invention, as the transition metal compound containing a ligand having a cyclopentadienyl skeleton is preferably used a compound represented by the following formula (II), more preferably a compound represented by the following formula (III):

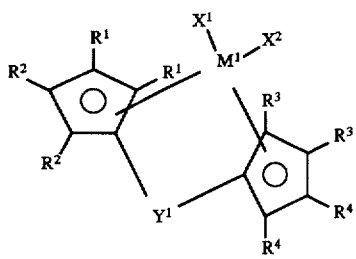

(II)

wherein $M^1$ is a transition metal atom of Group IV to Group VIB of the periodic table;

$R^1$, $R^2$, $R^3$ and $R^4$ are each a hydrogen, a halogen, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, and a part of adjacent groups $R^1$, $R^2$, $R^3$ and $R^4$ may be bonded to form together with the carbon atoms to which they are attached a ring, wherein $R^1$ to $R^4$ at two positions, for example even $R^1$ and $R^1$, may be the same or different, and R having the same suffix show a preferable combination for linking to form a ring;

$Y^1$ is a divalent hydrocarbon group of 1 to 20 carbon atoms, a divalent halogenated hydrocarbon group of 1 to 20 carbon atoms, a divalent silicon-containing group or a divalent germanium-containing group; and $X^1$ and $X^2$ are each a hydrogen, a halogen, a hydrocarbon group of 1 to 20 carbon atoms, a halogenated hydrocarbon group of 1 to 20 carbon atoms, an oxygen-containing group or a sulfur-containing group;

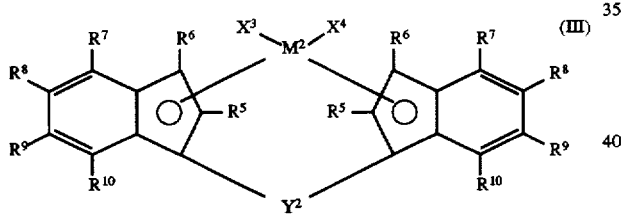

(III)

wherein $M^2$ is a transition metal atom of group IV to Group VIB of the periodic table;

$R^5$, $R^6$ and $R^8$ to $R^{10}$, which may be the same or different, are each a hydrogen, a halogen, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group;

$R^7$ is an aryl group of 6 to 16 carbon atoms;

$y^2$ is a divalent hydrocarbon group of 1 to 20 carbon atoms, a divalent halogenated hydrocarbon group of 1 to 20 carbon atoms, a divalent silicon-containing group or a divalent germanium-containing group; and $X^3$ and $X^4$ are each a hydrogen, a halogen, a hydrocarbon group of 1 to 20 carbon atoms, a halogenated hydrocarbon group of 1 to 20 carbon atoms, an oxygen-containing group or a sulfur-containing group.

In the present invention, as the compound (B) activating the transition metal compound (A) is preferably used at least one compound selected from the group consisting of, for example, (B-1) an organoaluminum compound, (B-2) an organoaluminum oxy-compound, and (B-3) a compound which reacts with the transition metal compound (A) to form an ion pair.

According to the process of the invention, a propylene polymer composition having well balanced properties among rigidity, heat resistance and impact resistance can be obtained.

The second process for preparing a propylene polymer composition according to the invention comprises:

conducting multistage polymerization including the following steps (a), (b), (d) and (e) in the presence of (A) a transition metal compound containing a ligand having a cyclopentadienyl skelton and (B) a compound activating the transition metal compound (A), in which the steps (a), (b), (d) and (e) may be carried out in any order to produce a propylene polymer composition comprising 20 to 85% by weight of a propylene (co)polymer (a) obtained in the step (a), 5 to 75% by weight of a propylene/olefin copolymer (b) obtained in the step (b), 5 to 75% by weitht of an ethylene/olefin copolymer (d) obtained in the step (d) and 5 to 30% by weight of an ethylene/olefin copolymer (e) obtained in the step (e), said composition having a melt flow rate, as measured at 230° C. under a load of 2.16 kg, of 0.01 to 500 g/min;

the step (a):

(i) homopolymerizing propylene or (ii) copolymerizing propylene and at least one olefin selected from ethylene and olefins of 4 to 20 carbon atoms to prepare a propylene (co)polymer (a) comprising not less than 80 mol % of constituent units derived from propylene, said propylene (co)polymer (a) having a melting point, as measured by a differential scanning calorimeter, of not lower than 100° C. and a melt flow rate, as measured at 230° C. under a load of 2.16 kg, of 0.01 to 1,000 g/10 min;

the step (b):

copolymerizing propylene and at least one olefin selected from ethylene and olefins of 4 to 20 carbon atoms to prepare a prpylene/olefin copolymer (b) comprising more than 50 mol % of constituent units derived from propylene, said propylene/olefin copolymer (b) having an intrinsic viscosity [η], as measured in decalin at 135° C., of 0.1 to 20 dl/g;

the step (d):

copolymerising ethylene and at least one olefin selected from olefins of 3 to 20 carbon atoms to prepare a ethylene/olefin copolymer (d) comprising more than 50 mol % and less than 90 mol % of constituent units derived from ethylene, said ethylene/olefin copolymer (d) having an intrinsic viscosity [η], as measured in decalin at 135° C., of 0.1 to 20 dl/g; and the step (e):

copolymerising ethylene and at least one olefin selected from olefins of 3 to 20 carbon atoms to prepare a ethylene/olefin copolymer (e) comprising not less than 90 mol % of constituent units derived from ethylene, said ethylene/olefin copolymer (e) having an intrinsic viscosity [η], as measured in decalin at 135° C., of 0.1 to 20 dl/g.

According to the invention, preferably the multistage polymerization is carried out in the order of the step (a), the step (b), the step (d) and the step (e).

Further, it is preferred that propylene is homopolymerized in the step (a), propylene is copolymerized with ethylene or 1-butene in the step (b), ethylene is copolymerized with propylene in the step (d) and ethylene is copolymerized with 1-butene in the step (e).

In the present invention, as the transition metal compound containing a ligand having a cyclopentadienyl skeleton is used, for example, a compound of the formula (II), preferably the formula (III).

In the present invention, as the compound (B) activating the transition metal compound (A) is used, for example, at least one compound selected from the compounds (B-1) to (B-3).

According to the processes of the present invention, propylene polymer compositions having well balanced properties among rigidity, heat resistance and impact resistance can be obtained.

The first propylene polymer composition of the present invention is one which is obtained by the first process for preparing a propylene polymer composition according to the invention.

The second propylene polyemer composision of the present invention is one which is obtained by the second process for preparing a propylene polymer composition according to the invention.

The propylene polymer compositions of the invention have well balanced properties among rigidity, heat resistance and impact resistance.

BRIEF DESCRIPTION OF THE DRAWING

FIG. 1 is an explanatory view showing steps for preparing an olefin polymerization catalyst used in the first process of the present invention.

FIG. 2 is an explanatory view showing steps for preparing an olefin polymerization catalyst used in the second process of the present invention.

BEST MODE FOR CARRYING OUT THE INVENTION

The process for preparing a propylene polymer composition according to the invention, and such a composition obatined will be described in detail hereinafter.

The term "polymerization" used herein is intended to mean both "homopolymerization" and "copolymerization". Also, the term "polymer" used herein is intended to mean both "homopolymer" and "copolymer".

In the first process for preparing a propylene polymer composition according to the invention, the propylene (co) polymer (a), the propylene/olefin copolymer (b) and the ethylene/olefin copolymer (c) are prepared in the presence of:

(A) a transition metal compound containing a ligand having a cyclopentadienyl skeleton, and (B) a compound activating the transition metal compound (A).

In the second process for preparing a propylene polymer composition according to the invention, the propylene (co) polymer (a), the propylene/olefin copolymer (b), the ethylene/olefin copolymer (d) and the ethylene/olefin copolymer (e) are prepared in the presence of:

(A) a transition metal compound containing a ligand having a cyclopentadienyl skeleton, and (B) a compound activating the transition metal compound (A).

First, the transition metal compound (A) containing a ligand having a cyclopentadienyl skeleton and the compound (B) activating the transition metal compound (A) are described.

The transition metal compound (A) containing a ligand having a cyclopentadienyl skeleton may be specifically a transition metal compound represented by the formula (I):

$$ML_x \qquad (I)$$

wherein M is a transition metal of Group IV to Group VIB of the periodic table, for example, zirconium (Zr), titanium (Ti), hafnium (Hf), vanadium (V), niobium (Nb), tantalum (Ta), chromium (Cr), molybdenum (Mo) and tungsten (W);

x is a valence of the transition metal; and

L is a ligand coordinated to the transition metal, and at least one of L is a ligand having a cyclopentadienyl skeleton, preferably at least two of L are ligands having a cyclopentadienyl skeleton.

The ligand having a cyclopentadienyl skeleton may be condensed with a benzene ring, a naphthalene ring, an acenaphthene ring, an indene ring, to form a further ring.

Examples of the ligands having a cyclopentadienyl skeleton include cyclopentadienyl group, indenyl group, 4,5,6, 7-tetrahydroindenyl group, 4,5,6,6a-tetrahydropentalenyl group, 7,8-dihydro-3H,6H-as-indacenyl group and fluorenyl group. These groups may be substituted with a halogen, a hydrocarbon group, a halogenated hydrocarbon group, a silicon-containing group, an oxygen-containing group, a sulfur-containing group, a nitrogen-containing group or a phosphorus-containing group.

When the transition metal compound of the formula (I) contains two or more of groups having a cyclopentadienyl skelton, two of them are preferably linked through a hydrocarbon group, a halogenated hydrocarbon group, a silicon-containing group, an oxygen-containing group, a sulfur-containing group, a nitrogen-containing group or a phosphorus-containing group.

L other than the ligand having a cyclopentadienyl skeleton is a hydrogen, a halogen, a hydrocarbon group, a halogenated hydrocarbon group, a silicon-containing group, an oxygen-containing group, a sulfur-containing group, a nitrogen-containing group or a phosphorus-containing group.

The transition metal compound (A) used in the invention is preferably a compound represented by the following formula (II), more preferably a compound represented by the following formula (III).

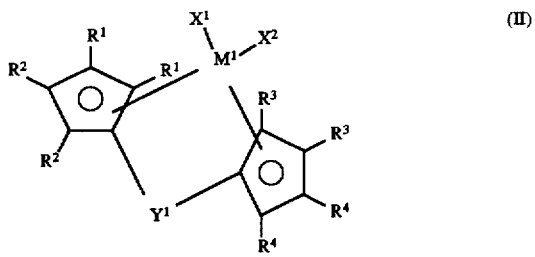

(II)

In this formula, $M^1$ is the same transition metal as defined for M in the formula (I), and preferably is titanium, zirconium or hafnium.

$R^1$, $R^2$, $R^3$ and $R^4$ are each a hydrogen, a halogen, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, and a part of adjacent groups $R^1$, $R^2$, $R^3$ and $R^4$ may be bonded to each other to form together with the carbon atoms to which they are bonded a ring. $R^1$ to $R^4$ each at two positions, respectively, for example, even $R^1$ and $R^1$, may be the same or different, and R having the same suffix show a preferable combination for linking to form a ring.

Examples of the halogens include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of rings formed by bonding these hydrocarbon groups include condensed ring groups such as benzene ring, naphthalene ring, acenaphthene ring and indene ring; and these condensed ring groups where one or more hydrogen atoms on the ring are replaced with alkyl groups such as methyl, ethyl, propyl and butyl.

Examples of the halogenated hydrocarbon groups include those hydrocarbon groups as mentioned above which are substituted by a halogen.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl;

silyl ethers of hydrocarbon-substituted silyls, such as trimethylsilyl ether;

silicon-substituted alkyl groups, such as trimethylsilylmethyl; and silicon-substituted aryl groups, such as trimethylphenyl.

Examples of the oxygen-containing groups include hydroxyl group; alkoxy groups, such as methoxy, ethoxy, propox and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those where the oxygen in the oxygen-containing groups as mentioned above is replaced with sulfer.

Examples of the nitrogen-containing groups include amino group; alkylamino groups, such as methylamino, dimethylamino, diethylamino, dipropylamino, dibutylamino and dicyclohexylamino; and arylamino groups and alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, preferred are hydrocarbon groups. Particularly preferred are hydrocarbon groups of 1 to 4 carbon groups such as methyl, ethyl, propyl and butyl; benzene rings formed by bonding hydrocarbon groups; and these condenced benzene rings where one or more hydrogen atoms on the ring are substituted by alkyl groups such as methyl, ethyl, n-propyl, iso-propyl, n-butyl, iso-butyl and tert-butyl.

$Y^1$ is a divalent hydrocarbon group of 1 to 20 carbon atoms, a divalent halogenated hydrocarbon group of 1 to 20 carbon atoms, a divalent silicon-containing group or a divalent germanium-containing group.

More specifically, there can be mentioned:

divalent hydrocarbon groups of 1 to 20 carbon atoms, for example, alkylene groups such as methylene, dimethylmethylene, 1,2-ethylene, dimethyl-1,2-ethylene, 1,3-trimethylene, 1,4-tetramethylene, 1,2-cyclohexylene and 1,4-cyclohexylen, and arylalkylene groups such as diphenylmethylene and diphenyl-1,2-ethylene;

divalent halogenated hydrocarbon groups, for example, those divalent hydrocarbon groups of 1 to 20 carbon atoms as mentioned above which are halogenated, such as chloromethylene;

divalent silicon-containing groups, for example, arylsilylene groups such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene, and alkyldisilyl, alkylaryldisilyl and aryldisilyl groups such as tetramethyl-1,2-disilyl and tetraphenyl-1,2-disilyl; and divalent germanium-containing groups, for example, those divalent silicon-containing groups as mentioned above where the silicon is replaced with germanium.

Of these, preferred are substituted silylene groups, such as dimethylsilylene, diphenylsilylene and methylphenylsilylene.

$X^1$ and $X^2$ are each a hydrogen, a halogen, a hydrocarbon group of 1 to 20 carbon atoms, a halogenated hydrocarbon group of 1 to 20 carbon atoms, an oxygen-containing group or a sulfur-containing group.

Specifically, there can be mentioned the same halogens, hydrocarbon groups of 1 to 20 carbon atoms, halogenated hydrocarbon groups of 1 to 20 carbon atoms and oxygen-containing groups as described for $R^1$, $R^2$, $R^3$ and $R^4$. Examples of the sulfur-containing groups include the same sulfur-containing groups as described for $R^1$, $R^2$, $R^3$ and $R^4$; and further, sulfonato groups such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups such as methylsulfinato, phenylsulfinato, benzenesulfinato, p-toluenesulfinato, trimethylbenzenesulfinato and pentafluorobenzenesulfinato.

Of these, preferred are halogens, hydrocarbon groups of 1 to 20 carbon atoms and sulfonato groups.

Particularly preferably used as the transition metal compound (A) in the invention is a compound represented by the following formula (III).

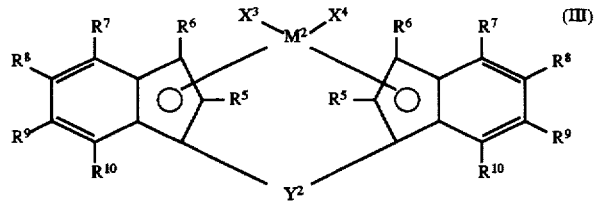

In this formula, $M^2$ is a transition metal atom as described for M in the formula (I), and preferably is titanium, zirconium or hafnium, and particularly is zirconium.

$R^5$, $R^6$ and $R^8$ to $R^{10}$, which may be the same or different, are each a hydrogen, a halogen, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group as described for $R^1$, $R^2$, $R^3$ and $R^4$ in the formula (II).

$R^7$ is an aryl group of 6 to 16 carbon atoms, for example, phenyl, α-naphthyl, β-naphthyl, anthracenyl, phenanthryl, pyrenyl, acenaphthyl, phenalenyl or aceanthrylenyl. Of these, preferred is phenyl, naphthyl or phenanthryl. These aryl groups may be substituted with halogens, hydrocarbon groups of 1 to 20 carbon atoms and halogenated hydrocarbon groups of 1 to 20 carbon atoms as described for $R^1$, $R^2$, $R^3$ and $R^4$ in the formula (II).

$Y^2$ is a divalent hydrocarbon group of 1 to 20 carbon atoms, a divalent halogenated hydrocarbon group of 1 to 20 carbon atoms, a divalent silicon-containing group or a divalent germanium-containing group as described for $Y^1$ in the formula (II).

$X^3$ and $X^4$ are each hydrogen, a halogen, a hydrocarbon group of 1 to 20 carbon atoms, a halogenated hydrocarbon group of 1 to 20 carbon atoms, an oxygen-containing group or a sulfur-containing group as described for $X^1$ and $X^2$ in the formula (II).

Listed below are examples of the transition metal compounds (A) containing a ligand having a cyclopentadienyl skeleton, usable in the invention.

Bis(cyclopentadienyl)zirconium dichloride,
Bis(indenyl)zirconium dichloride,
Bis(fluorenyl)zirconium dichloride,
Bis(n-propylcyclopentadienyl)zirconium dichloride,
Bis(t-butylcyclopentadienyl)zirconium dichloride,
Bis(trimethylsilylcyclopentadienyl)zirconium dichloride,
Bis(neopentylcyclopentadienyl)zirconium dichloride,
rac-Ethylene-bis(1-indenyl)zirconium dichloride,
rac-Ethylene-bis(1-indenyl)zirconium dibromide,
rac-Ethylene-bis(1-indenyl)dimethylzirconium,
rac-Ethylene-bis(1-indenyl)diphenylzirconium,
rac-Ethylene-bis(1-indenyl)methylzirconium monochloride,
rac-Ethylene-bis(1-indenyl)zirconiumbis (methanesulfonato),
rac-Ethylene-bis(1-indenyl)zirconiumbis(p-toluenesolfonate),
rac-Ethylene-bis(1-indenyl)zirconiumbis (trifluoromethanesulfonato),
rac-Ethylene-bis{1-4,5,6,7-tetrahydroindenyl)}zirconium dichloride,
Isopropylidene{1-cyclopentadienyl-1-(3-methylcyclopentadienyl)}zirconium dichloride,
Isopropylidene{1-(3-t-butylcyclopentadienyl)-1-(3-t-butylindenyl)}zirconium dichloride,
Isopropylidene(1-cyclopentadienyl-9-fluorenyl) zirconium dichloride,
Isopropylidene{1-cyclopentadienyl-9-(2,7-di(t-butyl) fluorenyl)}zirconium dichloride,
Isopropylidene{1-(3-methylcyclopentadienyl)-9-fluorenyl}zirconium dichloride,
rac-Dimethylsilylene-bis(l-cyclopentadienyl)zirconium dichloride,
rac-Dimethylsilylene-bis{1-(3-methylcyclopentadienyl)}zirconium dichloride,
rac-Dimethylsilylene-bis{1-(2,4-dimethylcyclopentadienyl)}zirconium dichloride,
rac-Dimethylsilylene-bis{1-(2,3,5-trimethylcyclopentadienyl)}zirconium dichloride,
rac-Dimethylsilylene-bis(1-indenyl)zirconium dichloride,
rac-Dimethylsilylene-bis{1-(2-methylindenyl)}zirconium dichloride,
rac-Dimethylsilylene-bis{1-(2-methyl-4-i-propylindenyl)}zirconium dichloride,
rac-Dimethylsilylene-bis{1-(2,7-dimethyl-4-i-propylindenyl)}zirconium dichloride,
rac-Diphenyllsilylene-bis{1-(2,7-dimethyl-4-i-propylindenyl)}zirconium dichloride,
rac-Dimethylsilylene-bis{1-(2-methyl-4,6-(di-i-propyl)indenyl}zirconium dichloride,
Dimethylsilylene-bis(1-cyclopentadienyl-1-indenyl) zirconium dichloride,
rac-Dimethylsilylene-bis(1,2-dihydroacenaphthylo[4,5-b]cyclopentadienyl)zirconium dichloride,
rac-Dimethylsilylene-bis(benzo[e]indenyl)zirconium dichloride, rac-Dimethylsilylene-bis{1-(4-phenylindenyl)}zirconium dichloride,
rac-Dimethylsilylene-bis{1-(2-methyl-4-phenylindenyl)}zirconium dichloride,
rac-Dimethylsilylene-bis{1-(2-methyl-4-(α-naphthyl)indenyl}zirconium dichloride,
rac-Dimethylsilylene-bis{1-(2-methyl-4-(β-naphthyl)indenyl}zirconium dichloride,
rac-Dimethylsilylene-bis{1-(2-methyl-4-(1-anthracenyl)indenyl)}zirconium dichloride,
rac-Dimethylsilylene-bis{1-(2-methyl-4-(2-anthracenyl)indenyl)}zirconium dichloride,
rac-Dimethylsilylene-bis{1-(2-methyl-4-(9-anthracenyl)indenyl)}zirconium dichloride,
rac-Dimethylsilylene-bis{1-(2-methyl-4-(9-phenanthryl)indenyl)}zirconium dichloride,
rac-Dimethylsilylene-bis{1-(2-methyl-4-(p-fluorophenyl)indenyl)}zirconium dichloride,
rac-Dimethylsilylene-bis{1-(2-methyl-4-(pentafluorophenyl)indenyl)}zirconium dichloride,
rac-Dimethylsilylene-bis{1-(2-methyl-4-(p-chlorophenyl)indenyl)}zirconium dichloride,
rac-Dimethylsilylene-bis{1-(2-methyl-4-(m-chlorophenyl)indenyl)}zirconium dichloride,
rac-Dimethylsilylene-bis{1-(2-methyl-4-(o-chlorophenyl)indenyl)}zirconium dichloride,
rac-Dimethylsilylene-bis{1-(2-methyl-4-(o,p-dichlorophenyl)phenylindenyl)}zirconium dichloride,
rac-Dimethylsilylene-bis{1-(2-methyl-4-(p-bromophenyl)indenyl)}zirconium dichloride,
rac-Dimethylsilylene-bis{1-(2-methyl-4-(p-tolyl)indenyl)}zirconium dichloride,
rac-Dimethylsilylene-bis{1-(2-methyl-4-(m-tolyl)indenyl)}zirconium dichloride,
rac-Dimethylsilylene-bis{1-(2-methyl-4-(o-tolyl)indenyl)}zirconium dichloride,
rac-Dimethylsilylene-bis{1-(2-methyl-4-(o,o'-dimethylphenyl)indenyl)}zirconium dichloride,
rac-Dimethylsilylene-bis{1-(2-methyl-4-(p-ethylphenyl)indenyl)}zirconium dichloride,
rac-Dimethylsilylene-bis{1-(2-methyl-4-(p-propylphenyl)indenyl)}zirconium dichloride,
rac-Dimethylsilylene-bis{1-(2-methyl-4-(p-benzylphenyl)indenyl)}zirconium dichloride,
rac-Dimethylsilylene-bis{1-(2-methyl-4-(p-biphenyl)indenyl)}zirconium dichloride,
rac-Dimethylsilylene-bis{1-(2-methyl-4-(m-biphenyl)indenyl)}zirconium dichloride,
rac-Dimethylsilylene-bis{1-(2-methyl-4-(p-trimethylsilylphenyl)indenyl)}zirconium dichloride,
rac-Dimethylsilylene-bis{1-(2-methyl-4-(m-trimethylsilylphenyl)indenyl)}zirconium dichloride, rac-Dimethylsilylene-bis{1-(2-ethyl-4-phenylindenyl)}zirconium dichloride, rac-Dimethylsilylene-bis{1-(2-ethyl-4-(α-naphthyl)indenyl)}zirconium dichloride, rac-Dimethylsilylene-bis{1-(2-ethyl-4-(β-naphthyl)indenyl}zirconium dichloride, rac-Dimethylsilylene-bis{1-(2-ethyl-4-(1-anthracenyl)indenyl)}zirconium dichloride, rac-Dimethylsilylene-bis{1-(2-ethyl-4-(2-anthracenyl)indenyl)}zirconium dichloride, rac-Dimethylsilylene-bis{1-(2-ethyl-4-(9-anthracenyl)indenyl)}zirconium dichloride, rac-Dimethylsilylene-bis{1-(2-ethyl-4-(9-phenanthryl)indenyl)}zirconium dichloride, rac-Diphenylsilylene-bis{1-(2-ethyl-4-phenylindenyl)}zirconium dichloride, rac-Dimethylsilylene-bis{1-(2-phenyl-4-phenylindenyl)}zirconium dichloride, rac-Dimethylsilylene-bis{1-(2-n-propyl-4-phenylindenyl)}zirconium dichloride, rac-Dimethylsilylene-bis{1-(2-n-propyl-4- (α-naphthyl)indenyl)}zirconium dichloride, rac-Dimethylsilylene-bis{1-(2-n-propyl-4-(β-naphthyl)indenyl}zirconium dichloride, rac-Dimethylsilylene-bis{1-(2-n-propyl-4-(1-anthracenyl)indenyl)}zirconium dichloride, rac-Dimethylsilylene-bis{1-(2-n-propyl-4-(2-anthracenyl)indenyl)}zirconium dichloride, rac-Dimethylsilylene-bis{1-(2-n-propyl-4-(9-anthracenyl)indenyl)}zirconium dichloride, rac-Dimethylsilylene-bis{1-(2-n-propyl-4-(9-phenanthryl)indenyl)}zirconium dichloride, rac-Dimethylsilylene-bis{1-(2-i-butyl-4-phenylindenyl)}zirconium dichloride, rac-Dimethylsilylene-bis{1-(2-i-butyl-4-(α-naphthyl)indenyl)}zirconium dichloride, rac-Dimethylsilylene-bis{1-(2-i-butyl-4-(β-naphthyl)indenyl}zirconium dichloride, rac-Dimethylsilylene-bis{1-(2-i-butyl-4-(1-anthracenyl)indenyl)}zirconium dichloride, rac-Dimethylsilylene-bis{1-(2-i-butyl-4-(2-anthracenyl)indenyl)}zirconium dichloride, rac-Dimethylsilylene-bis{1-(2-i-butyl-4-(9-anthracenyl)indenyl)}zirconium dichloride, rac-Dimethylsilylene-bis{1-(2-i-butyl-4-(9-phenanthryl)indenyl)}zirconium dichloride, rac-Diethylsilylene-bis{(1-(2-methyl-4-phenylindenyl)}zirconium dichloride, rac-Di-(i-propyl)silylene-bis{1-(2-methyl-4-phenylindenyl)}zirconium dichloride, rac-Di-(n-butyl)silylene-bis{1-(2-methyl-4-phenylindenyl)}zirconium dichloride, rac-Dicyclohexylsilylene-bis{1-(2-methyl-4-phenylindenyl)}zirconium dichloride, rac-Methylphenylsilylene-bis{1-(2-methyl-4-phenylindenyl)}zirconium dichloride, rac-Diphenylsilylene-bis{1-(2-methyl-4-phenylindenyl)}zirconium dichloride, rac-Di(p-tolyl)silylene-bis{1-(2-methyl-4-phenylindenyl)}zirconium dichloride, rac-Di(p-chlorophenyl)silylene-bis{1-(2-methyl-4-phenylindenyl)}zirconium dichloride, rac-Methylene-bis{1-(2-methyl-4-phenylindenyl)}zirconium dichloride, rac-Ethylene-bis{1-(2-methyl-4-phenylindenyl)}zirconium dichloride, rac-Dimethylgermylene-bis{1-(2-methyl-4-phenylindenyl)}zirconium dichloride, rac-Dimethylsilylene-bis{1-(2-methyl-4-phenylindenyl)}zirconium dibromide, rac-Dimethylsilylene-bis{1-(2-methyl-4-phenylindenyl)}zirconium dimethyl, rac-Dimethylsilylene-bis{1-(2-methyl-4-phenylindenyl)}zirconium methylchloride, rac-Dimethylsilylene-bis{1-(2-methyl-4-phenylindenyl)}zirconium chloride $SO_2Me$, rac-Dimethylsilylene-bis{1-(2-methyl-4-phenylindenyl)}zirconium chloride $OSO_2Me$, rac-Dimethylsilylene-bis{1-(2-methyl-4-phenylindenyl)}titanium dichloride, and rac-Dimethylsilylene-bis{1-(2-methyl-4-phenylindenyl)}hafnium dichloride.

Also employable are transition metal compounds corresponding to the above mentioned compounds where the metal zirconium, titanium or hafnium is replaced with a metal vanadium, niobium, tantalum, chromium, molybdenum or tungsten.

The compound (B) which activates the transition metal compound (A) (hereinafter sometimes referred to as "activating compound"), that is used in the process for preparing a propylene polymer composition according to the invention, may be selected from the group consisting of:

(B-1) an organoaluminum compound [component (B-1)], (B-2) an organoaluminum oxy-compound [component (B-2)], and (B-3) a compound which reacts with the transition metal compound (A) to form an ion pair [component (B-3)].

As the activating compound (B), two or more components selected from the components (B-1) to (B-3) can be used in combination, and a preferred combination is the component (B-1) and the component (B-2).

The organoaluminum compound (B-1) used for preparing a propylene polymer composition together with the transition metal compound (A) is, for example, an organoaluminum compound represented by the formula (IV):

$$R^a{}_n AlX_{3-n} \quad (IV)$$

wherein $R^a$ is a hydrocarbon group of 1 to 12 carbon atoms,

X is a halogen atom or a hydrogen atom, and n is 1 to 3.

In the formula (IV), $R^a$ is a hydrocarbon group of 1 to 12 carbon atoms, for example, an alkyl group, a cycloalkyl group or an aryl group, including for example methyl, ethyl, n-propyl, isopropyl, isobutyl, pentyl, hexyl, octyl, cyclopentyl, cyclohexyl, phenyl and tolyl.

Specifically, such organoaluminum compound (B-1) may be as follows:

trialkylaluminums, such as trimethylaluminum, triethylaluminum, triisopropylaluminum, triisobutylaluminum, trioctylaluminum, tri(2-ethylhexyl)aluminum and tridecylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichoride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (B-1) is a compound represented by the formula (V):

$$R^a{}_nAlY_{3-n} \quad (V)$$

wherein $R^a$ is the same as defined above; Y is —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group; n is 1 to 2; $R^b$, $R^c$, $R^d$ and $R^h$ are each methyl, ethyl, isopropyl, isobutyl, cyclohexyl, phenyl or the like, $R^e$ is hydrogen, methyl, ethyl, isopropyl, phenyl, trimethylsilyl or the like; and $R^f$ and $R^g$ are each methyl, ethyl or the like.

Examples of such organoaluminum compounds include:

(1) compounds of the formula $R^a{}_nAl(OR^b)_{3-n}$, e.g., dimethylaluminum methoxide, diethylaluminum ethoxide and diisobutylaluminum methoxide;

(2) compounds of the formula $R^a{}_nAl(OSiR^c{}_3)_{3-n}$, e.g., $Et_2Al(OSiMe_3)$, $(iso-Bu)_2Al(OSiMe_3)$ and $(iso-Bu)_2Al(OSiEt_3)$;

(3) compounds of the formula $R^a{}_nAl(OAlR^d{}_2)_{3-n}$, e.g., $Et_2AlOAlEt_2$ and $(iso-Bu)_2AlOAl(iso-Bu)_2$;

(4) compounds of the formula $R^a{}_nAl(NR^e{}_2)_{3-n}$, e.g., $Me_2AlNEt_2$, $Et_2AlNHMe$, $Me_2AlNHEt$, $Et_2AlN(SiMe_3)_2$ and $(iso-Bu)_2alN(SiMe_3)_2$;

(5) compounds of the formula $R^a{}_nAl(SiR^f{}_2)_{3-n}$, e.g., $(iso-Bu)_2AlSiMe_3$; and (6) compounds of the formula $R^aAl(N(R^g)AlR^h{}_2)_{3-n}$, e.g., $Et_2AlN(Me)AlEt_2$ and $(iso-Bu)_2AlN(Et)Al(iso-Bu)_2$.

Of the organoaluminum compounds represented by the formula (IV) or (V), preferred are compounds of the formula $R^a{}_3Al$, and particularly preferred are compounds of the same formula wherein $R^h$ is an isoalkyl group.

Such organoaluminum compounds (B-1) can be used singly or in combination of two or more kinds.

The organoaluminum oxy-compound (B-2) used for preparing a propylene polymer composition together with the transition metal compound (A) may be either aluminoxane conventionally known or such a benzene-insoluble organoaluminum oxy-compound as exemplified in Japanese Patent Laid-Open Publication No. 78687/1990.

The conventionally known aluminoxane can be prepared by, for example, the following procedures.

(1) A procedure of adding an organoaluminum compound such as trialkylaluminum to a hydrocarbon medium suspension of compounds containing adsorbed water or salts containing water of crystallization, e.g., magnesium chloride hydrate, copper sulfate hydrate, aluminum sulfate hydrate, nickel sulfate hydrate and cerous chloride hydrate, so as to allow the organoaluminum compound to react with the adsorbed water or the water of crystallization.

(2) A procedure of allowing water, ice or water vapor to directly act on an organoaluminum compound such as trialkylaluminum in a medium such as benzene, toluene, ethyl ether or tetrahydrofuran.

(3) A procedure of allowing organotin oxide such as dimethyltin oxide or dibutyltin oxide to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the solution recovered and the residue is dissolved again in a solvent or suspended in a poor solvent for aluminoxane.

Examples of the organoaluminum compounds used for preparing aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum; tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxide, such as diethylaluminum phenoxide.

Of these, preferred are trialkylaluminums and tricycloalkylaluminums, and particularly preferred is trimethylaluminum.

Also employable as the organoaluminum compound used for preparing aluminoxane is isoprenylaluminum represented by the formula (VI):

$$(iC_4H_9)_xAl_y(C_5H_{10})_z \quad (VI)$$

wherein x, y and z are each a positive number, and $z \geq 2x$.

The organoaluminum compounds mentioned above are used singly or in combination.

Examples of the solvents used for preparing aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons, particularly chlorides and bromides thereof. In addition, ethers such as ethyl ether and tetrahydrofuran can be also employed. Of the solvents, preferred are aromatic hydrocarbons and aliphatic hydrocarbons.

Such organoaluminum oxy-compounds (B-2) as mentioned above can be used singly or in combination of two or more kinds.

The compound (B-3) which reacts with the transition metal compound (A) to form an ion pair, that is used for preparing a propylene polymer composition together with the transition metal compound (A), includes Lewis acid, ionic compounds and carborane compounds, as described for example in National Publications of international Patent No. 501950/1989 and No. 502036/1989, Japanese Patent Laid-Open Publication No. 179005/1991, No. 179006/1991, No. 207703/1991 and No. 207704/1991, and U.S. patent application No. 547,718, filed Jul. 3, 1990.

The Lewis acid includes magnesium-containing Lewis acid, aluminum-containing Lewis acid and boron-containing Lewis acid. Of these, boron-containing Lewis acid is preferred.

The Lewis acid which contains a boron atom is, for example, a compound represented by the formula:

$$BR^iR^jR^k \quad \text{(VII)}$$

wherein $R^i$, $R^j$ and $R^k$ are each independently a phenyl group which may have substituents such as fluorine, methyl and trifluoromethyl, or a fluorine atom.

Examples of the compounds represented by the above formula (VII) include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, particularly preferred is tris(pentafluorophenyl)boron.

The ionic compound employable in the invention is a salt comprising a cationic compound and an anionic compound. The anion reacts with the transition metal compound (A) to render the compound (A) cationic and to form an ion pair, resulting in stabilizing the transition metal cation species. Examples of such anion include organoboron compound anion, organoarsenic compound anion and organoaluminum compound anion. Preferred are those relatively bulky and stabilizing the transition metal cation species. Examples of cation include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferrocenium cation, etc.

Of these, preferred are ionic compounds containing a boron compound as anion, and examples thereof include:

trialkyl-substituted ammonium salts, such as triethylammoniumtetra(phenyl)boron, tripropylammoniumtetra(phenyl)boron, tri(n-butyl) ammoniumtetra(phenyl)boron, trimethylammoniumtetra(p-tolyl) boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl) boron, tri(n-butyl)ammoniumtetra(o-tolyl)boron and tri(n-butyl) ammoniumtetra(4-fluorophenyl)boron;

N,N,-dialkylanilinium salts, such as N,N-dimethylaniliniumtetra (phenyl)boron, N,N-diethylaniliniumtetra (phenyl)boron and N,N-2,4,6-pentamethylaniliniumtetra (phenyl)boron;

dialkylammonium salts, such as di(n-propyl) ammoniumtetra(pentafluorophenyl)boron and dicyclohexylammoniumtetra(phenyl)boron; and triarylphosphonium salts, such as triphenylphosphoniumtetra(phenyl)boron, tri (methylphenyl)phosphoniumtetra(phenyl)boron and tri (dimethylphenyl)phosphoniumtetra(phenyl)boron.

Also employable as the ionic compound which contains a boron atom are triphenylcarbeniumtetrakis(pentafluorophenyl)borate, N,N-dimethylaniliniumtetrakis(pentafluorophenyl) borate and ferroceniumtetrakis(pentafluorophenyl) borate.

Further, the following compounds can be also employed. (In the ionic compounds listed below, the counter ion is tri(n-butyl)ammonium, but not intended to limit thereto.)

Salts of anions, for example, bis[tri(n-butyl)ammonium] nonaborate, bis[tri(n-butyl)ammonium]decaborate, bis [tri(n-butyl)ammonium]undecaborate, bis[tri(n-butyl) ammonium]dodecaborate, bis[tri(n-butyl)ammonium] decachlorodecaborate, bis[tri(n-butyl)ammonium] dodecachlorododecaborate, tri(n-butyl) ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl) ammoniumbromo-1-carbadodecaborate.

Moreover, borane compounds and carborane compounds can be also employed. These compounds are employed as the Lewis acid or the ionic compounds.

Examples of the borane and carborane compounds include:

borane and carborane complex compounds and salts of carborane anions, such as, decaborane(14), 7,8-dicarbaundecaborane (13), 2,7-dicarbaundecaborane (13), undecahydride-7,8-dimethyl-7,8-dicarbaundecaborane, dodecahydride-11-methyl-2,7-dicarbaundecaborane, tri(n-butyl)ammonium-6-carbadecaborate(14), tri(n-butyl)ammonium-6(12), tri (n-butyl)ammonium-7-carbaundecaborate (13), tri(n-butyl)ammonium-7,8-dicarbaundecaborate (12), tri(n-butyl)ammonium-2,9-dicarbaundecaborate (12), tri(n-butyl)ammoniumdodecahydride-8-methyl-7,9-dicarbaundecaborate, tri(n-butyl) ammoniumundecahydride-8-ethyl-7,9-dicarbaundecaborate, tri(n-butyl) ammoniumundecahydride-8-butyl-7,9-dicarbaundecaborate, tri(n-butyl) ammoniumundecahydride-8-allyl-7,9-dicarbaundecaborate, tri(n-butyl) ammoniumundecahydride-9-trimethylsilyl-7,8-dicarbaundecaborate and tri(n-butyl) ammoniumundecahydride-4,6-dibromo-7-carbaundecaborate; and carboranes and salts of carboranes, such as, 4-carbanonaborane (14), 1,3-dicarbanonaborane(13), 6,9-dicarbadecaborane (14), dodecahydride-1-phenyl-1,3-dicarbanonaborane, dodecahydride-1-methyl-1,3-dicarbanonaborane and undecahydride-1,3-dimethyl-1,3-dicarbanonaborane.

Furthermore, the following compounds can be also employed. (In the ionic compounds listed below, the counter ion is tri(n-butyl)ammonium, but not intended to limit thereto.)

Salts of metallic carboranes and metallic borane anions, for example, tri(n-butyl)ammoniumbis(nonahydride-1, 3-dicarbanonaborate)cobaltate(III), tri(n-butyl) ammoniumbis(undecahydride-7,8-dicarbaundecaborate) ferrate(III), tri(n-butyl) ammoniumbis(undecahydride-7,8-dicarbaundecaborate)cobaltate(III), tri(n-butyl) ammoniumbis(undecahydride-7,8-dicarbaundecaborate) nickelate(III), tri(n-butyl) ammoniumbis(undecahydride-7,8-dicarbaundecaborate)cuprate(III), tri(n-butyl) ammoniumbis(undecahydride-7,8-dicarbaundecaborate) aurate(III), tri(n-butyl) ammoniumbis(nonahydride-7,8-dimethyl-7,8-dicarbaundecaborate) ferrate(III), tri(n-butyl) ammoniumbis(nonahydride-7,8-dimethyl-7,8-dicarbaundecaborate) chromate(III), tri(n-butyl) ammoniumbis(tribromooctahydride-7,8-dicarbaundecaborate)cobaltate(III), tri(n-butyl) ammoniumbis(dodecahydrided bis[tri(n-butyl) ammonium]bis(dodecahydridedodecaborate)-nickelate (III), tris[tri(n-butyl)ammonium]bis(undecahydride-7- carbaundecaborate) chromate(III), bis[tri(n-butyl) ammonium]bis(undecahydride-7-carbaundecaborate) manganate(IV), bis[tri(n-butyl)ammonium]bis (undecahydride-7-carbaundecaborate)cobaltate(III) and bis[tri(n-butyl)ammonium]bis(undecahydride-7-carbaundecaborate) nickelate(IV).

The compounds (B-3) which react with the transition metal compound (A) to form an ion pair can be used singly or in combination of two or more kinds.

In the present invention, at least one of the transition metal compound (A) and the activating compound (B) may be supported on a fine particle carrier.

The fine particle carrier is an inorganic or organic compound, and is a particulate or granular solid having a particle diameter of 10 to 300 μm, preferably 20 to 200 μm.

The inorganic carrier is preferably a porous oxide, and examples thereof include $SiO_2$, $Al_2O_3$, $MgO$, $ZrO_2$, $TiO_2$, $B_2O_3$, $CaO$, $ZnO$, $BaO$, $ThO_2$ and mixtures thereof, such as $SiO_2$—$MgO$, $SiO_2$—$Al_2O_3$, $SiO_2$—$TiO_2$, $SiO_2$—$V_2O_5$, $SiO_2$—$Cr_2O_3$ $SiO_2$—$TiO_2$—$MgO$. Of these, preferred is a carrier containing at least one of $SiO_2$ and $Al_2O_3$ as its major component.

The above-mentioned inorganic oxides may contain carbonates, sulfates, nitrates and oxides, e.g., $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$, in small amounts.

The properties of the fine particle carrier vary depending on the type and the process for the preparation thereof, but preferably used in the invention is a carrier having a specific surface area of 50 to 1,000 m²/g, preferably 100 to 700 m²/g, and a pore volume of 0.3 to 2.5 cm³/g. The fine particle carrier may be used after calcined at a temperature of 100° to 1,000° C., preferably 150° to 700° C., if desired.

Also employable as the fine particle carrier in the invention is a granular or particulate solid of an organic compound having a particle diameter of 10 to 300 μm. Examples of such organic compounds include (co)polymers produced mainly from α-olefins of 2 to 14 carbon atoms such as ethylene, propylene, 1-butene and 4-methyl-1-pentene, and (co)polymers produced mainly from vinylcyclohexane or styrene.

The fine particle carrier may contain a surface hydroxyl group and/or water.

The olefin polymerization catalyst used in the invention may be either a catalyst comprising the transition metal compound (A) supported on the fine particle carrier and the activating compound (B), a solid catalyst comprising the transition metal compound (A) and the activating compound (B) both supported on the fine particle carrier or a prepolymerized catalyst obtained by prepolymerizing an olefin in the presence of the transition metal compound (A), the activating compound (B) and the fine particle carrier.

The solid catalyst can be prepared by mixing and contacting the transition metal compound (A), the activating compound (B) and the fine particle carrier with each other in an inert hydrocarbon medium or an olefin medium.

Examples of the inert hydrocarbon media used for preparing the olefin polymerization catalyst include:

aliphatic hydrocarbons, such as propane, butane, pentane, hexane, heptane, octane, decane, dodecane and kerosine;

alicyclic hydrocarbons, such as cyclopentane, cyclohexane and methylcyclopentane;

aromatic hydrocarbons, such as benzene, toluene and xylene;

halogenated hydrocarbons, such as ethylene chloride, chlorobenzene and dichloromethane; and mixtures of these hydrocarbons.

The order of mixing and contacting the above components may be optionally determined, but preferably, the fine particle carrier is first mixed and contacted with the activating compound (B) and then with the transition metal compound (A);

a mixture of the activating compound (B) and the transition metal compound (A) is mixed and contacted with the fine particle carrier; or the fine particle carrier, the activating compound (B) and water are mixed and contacted with each other and then with the transition metal compound (A).

For supporting the transition metal compound (A) on the fine particle carrier, there can be generally employed a method where the transition metal compound (A) and the fine particle carrier are mixed and contacted in a hydrocarbon medium.

More specifically, the following procedure may be carried out:

(1) The activating compound (B) is added to and mixed with a suspension of the fine particle carrier in a hydrocarbon medium, the mixture is filtered to remove the medium, and the resulting solid component is further mixed and contacted with the transition metal compound (A) in the form of a suspension or a solution in a hydrocarbon medium;

(2) The activating compound (B) is added to and mixed with a suspension of the fine particle carrier in an aromatic hydrocarbon medium followed by further adding an aliphatic hydrocarbon medium, and then the aromatic hydrocarbon medium is removed under a reduced pressure to precipitate an organoaluminum oxy-compound on the fine particle carrier. After removing the aliphatic hydrocarbon medium, the resulting solid component is further mixed and contacted with the transition metal compound (A) in the form of a suspension or a solution in a hydrocarbon medium; or (3) The activating compound (B) and the transition metal compoud (A) are added to and mixed with a suspension of the fne particle carrier in a hydrocarbon medium, and then the medium is removed by filtration or evaporation.

In the mixing of the above components, the transition metal compound (A) is used in an amount of usually $10^{-6}$ to $5 \times 10^{-3}$ mol, preferably $3 \times 10^{-6}$ to $10^{-3}$ mol, based on 1 g of the fine particle carrier; and a concentration of the transition metal compound (A) is in the range of about $5 \times 10^{-6}$ to $2 \times 10^{-2}$ mol/liter, preferably $10^{-5}$ to $10^{-2}$ mol/liter. If the component (B-1) is used as the activating compound (B), an atomic ratio of aluminum in the component (B-1) to the transition metal in the transition metal compound (A), (Al/transition metal), is in the range of usually 10 to 3,000, preferably 20 to 2,000. If the component (B-2) is used, an atomic ratio of aluminum in the component (B-2) to the transition metal in the transition metal compound (A), (Al/transition metal), is in the range of usually 10 to 3,000, preferably 20 to 2,000. If the component (B-3) is used, a molar ratio of the transition metal compound (A) to the component (B-3), (transition metal compound (A)/ component (B-3)), is in the range of usually 0.01 to 10, preferably 0.1 to 5.

In the mixing of the above components, the temperature is in the range of usually −50° to 150° C., preferably −20° to 120° C.; and the contact time is in the range of 1 to 1,000 minutes, preferably 5 to 600 minutes. The mixing temperature may be varied during the mixing procedure.

Supporting of the transition metal compound (A) on the fine particle carrier can be carried out in the presence of zeolite or organic amines.

Zeolite used herein is, for example, a compound represented by the general formula $$M_{2/n} O \cdot Al_2 O_3 \cdot xSiO_2 \cdot yH_2O$$

wherein M is Na, K, Ca or Ba, n is a valence of M, x is 2 to 10, and y is 2 to 7, and Molecular Sieve™ is preferred.

Examples of the organic amines include monoalkylamines, such as methylamine, ethylamine, n-propylamine, isopropylamine, n-butylamine and t-butylamine; dialkylamines, such as dimethylamine, diethylamine, di-n-propylamine, diisopropylamine, di-n-butylamine and di-t-butylamine; and trialkylamines, such as trimethylamine, triethylamine, tri-n-propylamine and tri-n-butylamine.

Zeolite may be used in an amount of usually $1\times10^{-2}$ to $1\times10^2$ g, preferably $1\times10^{-1}$ to 10 g, based on 1 g of the fine particle carrier. The organic amine may be used in an amount of usually $1\times10^{-7}$ to $2\times10^{-2}$ mol, preferably $1\times10^{-5}$ to $1\times10^{-2}$ mol, based on 1 g of the fine particle carrier.

The use of zeolite or the organic amine enables to produce a solid catalyst in which a larger amount of the transition metal compound (A) is supported.

In the solid catalyst obtained in the manner as described above, it is desired that the transition metal atom is supported in an amount of $10^{-6}$ to $10^{-3}$ g·atom, preferably $2\times10^{-6}$ to $3\times10^{-4}$ g·atom, based on 1 g of the fine particle carrier, and the aluminum atom derived from the component (B-1) [or the component (B-2)] is supported in an amount of about $10^{-3}$ to $10^{-1}$ g·atom, preferably $2\times10^{-3}$ to $5\times10^{-2}$ g·atom, based on 1 g of the fine particle carrier. The component (B-3) is desirably supported in an amount of $10^{-7}$ to 0.1 g·atom, preferably $2\times10^{-7}$ to $3\times10^{-2}$ g·atom, based on 1 g of the fine particle carrier, in terms of the boron atom derived from the component (B-3).

The prepolymerized catalyst can be prepared by prepolymerizing a small amount of an olefin in an inert hydrocarbon medium or an olefin medium in the presence of the transition metal compound (A), the activating compound (B) and the fine particle carrier. It is preferred to use the transition metal compound (A), the activating compound (B) and the fine particle carrier in the form of a solid catalyst together as described above.

For preparing the prepolymerized catalyst, the inert hydrocarbon solvents as mentioned above can be employed.

In the preparation of the prepolymerized catalyst, the transition metal compound (A) is used in an amount of usually $10^{-6}$ to $5\times10$ hu $-3$ mol, preferably $3\times10^{-6}$ to $10^{-3}$ mol, based on 1 g of the fine particle carrier; and a concentration of the transition metal atom (A) is in the range of about $5\times10^{-6}$ to $2\times10^{-2}$ mol/liter-medium, preferably $10^{-5}$ to $10^{-2}$ mol/liter-medium. If the component (B-1) is used as the activating compound (B), an atomic ratio of aluminum in the component (B-1) to the transition metal in the transition metal compound (A), (Al/transition metal), is in the range of usually 10 to 3,000, preferably 20 to 2,000. If the component (B-2) is used, an atomic ratio of aluminum in the component (B-2) to the transition metal in the transition metal compound (A), (Al/transition metal), is in the range of usually 10 to 3,000, preferably 20 to 2,000. If the component (B-3) is used, a molar ratio of the transition metal compound (A) to the component (B-3), (transition metal compound (A)/component (B-3)), is in the range of usually 0.01 to 10, preferably 0.1 to 5.

The prepolymerization temperature is in the range of −20° to 80° C., preferably 0° to 60° C.; and the prepolymerization time is in the range of 0.5 to 100 hours, preferably about 1 to 50 hours.

The olefin used for the prepolymerization may be any one selected from those used for the polymerization, but preferred is the same monomer as used for the polymerization or a mixture of the same monomer as used for the polymerization and an olefin.

In the prepolymerized catalyst obtained as described above, it is desired that the transition metal atom is supported in an amount of $10^{-6}$ to $10^{-3}$ g·atom, preferably $2\times10^{-6}$ to $3\times10^{-4}$ g·atom, based on 1 g of the fine particle carrier, and the aluminum atom derived from the component (B-1) or the component (B-2) is supported in an amount of about $10^{-3}$ to $10^{-1}$ g·atom, preferably $2\times10^{-3}$ to $5\times10^{-2}$ g·atom, based on 1 g of the fine particle carrier. The component (B-3) is desirably supported in an amount of $10^{-7}$ to 0.1 g·atom, preferably $2\times10^{-7}$ to $3\times10^{-2}$ g·atom, based on 1 g of the fine particle carrier, in terms of the boron atom derived from the component (B-3). The amount of a polymer produced by the prepolymerization is desired to be in the range of about 0.1 to 500 g, preferably 0.3 to 300 g, particularly preferably 1 to 100 g, based on 1 g of the fine particle carrier.

According to the first process for preparing a propylene polymer composition of the present invention, multistage polymerization including the steps (a), (b) and (c), which will be described later more in detail, is carried out in the presence of the olefin polymerization catalyst comprising the transition metal compound (A) and the activating compound (B), to prepare a propylene polymer composition. The polymerization steps may be carried out in any order, is each of the second and subsequent stage polymerizations is conducted in the presence of a polymer or polymers prepared in the preceding stage or stages, respectively.

In the step (a), (i) propylene is homopolymerized, or (ii) propylene is copolymerized with at least one olefin selected from ethylene and olefins of 4 to 20 carbon atoms, in the presence of the olefin polymerization catalyst comprising the transition metal compound (A) and the activating compound (B), to prepare a propylene (co)polymer (a).

Examples of the olefins of 4 to 20 carbon atoms used herein include 1-butene, 1-pentene, 1-hexene, 4-methyl-1-pentene, 1-octene, 1-decene, 1-dodecene, 1-tetradecene, 1-hexadecene, 1-octadecene and 1-eicosene.

The olefin used for the copolymerization of propylene is preferably ethylene or 1-butene. When ethylene or 1-butene is used, the resulting (co)polymer (a) is lowered in the glass transition temperature and thus the polymer composition obtained is improved in the impact resistance.

In the step (a), the polymerization can be carried out in a liquid phase polymerization, e.g., a suspension polymerization, and a gas phase polymerization.

In the liquid phase polymerization, the inert hydrocarbons same as used for the preparation of the catalyst described before, or the olefin itself can be used as a medium.

For the polymerization in the step (a), the transition metal compound (A) is desired to be used in an amount of usually $10^{-8}$ to $10^{-3}$ g·atom/liter, preferably $10^{-7}$ to $10^{-4}$ g·atom/liter, in terms of a concentration of the transition metal atom derived from the transition metal compound (A) in the polymerization system. If the component (B-1) is used as the activating compound (B), an atomic ratio of aluminum in the component (B-1) to the transition metal in the transition metal compound (A), (Al/transition metal), is in the range of usually 5 to 10,000, preferably 10 to 5,000. If the component (B-2) is used, an atomic ratio of aluminum in the component (B-2) to the transition metal in the transition metal compound (A), (Al/transition metal), is in the range of usually 5 to 10,000, preferably 10 to 5,000. If the component (B-3) is used, a molar ratio of the transition metal compound (A) to the component (B-3), (transition metal compound (A)/component (B-3)), is in the range of usually 0.01 to 10, preferably 0.5 to 5.

When the solid catalyst or the prepolymerized catalyst is used, a compound selected from the component (B-1), the component (B-2) and the component (B-3), all of which are not supported on a fine particle carrier, may be used in addition to the activating compound (B) supported on a fine particle carrier.

The polymerization temperature is desired to be in the range of usually −50° to 100° C., preferably 0° to 90° C., in the case of slurry polymerization; in the range of usually 0° to 250° C., preferably 20° to 200° C., in the case of liquid phase polymerization; and in the range of usually 0° to 120° C., preferably 20° to 100° C., in the case of gas phase polymerization. The polymerization pressure is in the range of usually atmospheric pressure to 100 kg/cm$^2$, preferably atmospheric pressure to 50 kg/cm$^2$.

The molecular weight of the resulting propylene (co)polymer (a) can be regulated by the use of hydrogen in the polymerization system or varying the polymerization temperature.

The step (a) is carried out usually in a single stage, but the polymerization operation may be divided into plural stages to obtain a polymer containing two or more components greatly different from each other in the molecular weight. For example, the step (a) can be carried out in such a manner that a ratio of a melt flow rate of a polymer obtained in the initial stage of the step (a) to a melt flow rate of a polymer obtained in the latter stage of the step (a) is not less than 20, in an extreme case, not less than 30.

The propylene (co)polymer (a) prepared in this step (a) is that comprising constituent units derived from propylene in amounts of not less than 80 mol %, preferably not less than 90 mol %, more preferably not less than 95 mol %, and is particularly preferably a propylene homopolymer. This propylene (co)polymer (a) has a melting point, as measured by a differential scanning calorimeter, of 100° to 167° C., preferably 110° to 167° C., more preferably 120° to 167° C., particularly preferably 130° to 167° C. If the melting point is lower than 100° C., the propylene (co)polymer may have a reduced heat resistance and lose characteristics required for propylene polymers. The propylene (co)polymer (a) has a melt flow rate, as measured at 230° C. under a load of 2.16 kg, of 0.01 to 1,000 g/10 min, preferably 0.1 to 500 g/10 min. If the melt flow rate is less than 0.01 g/10 min, moldability of the polymer composition obtained may be reduced. If the melt flow rate exceeds 1,000 g/10 min, mechanical strength of the polymer composition obtained may also be reduced. The propylene (co)polymer (a) is desired to have a flexural modulus (FM) of not less than 5,000 kg/cm$^2$.

The melting point is measured using DSC-50 available from Shimazu Seisakusho in which a sample has been temporarily melted and cooled is heated at a heat-up rate of 10° C./min. The melt flow rate is measured in accordance with ASTM D1238-T65 under the conditions of a temperature of 230° C. and a load of 2.16 kg.

In the step (b), propylene is copolymerized with at least one olefin selected from ethylene and olefins of 4 to 20 carbon atoms in the presence of an olefin polymerization catalyst comprising the transition metal compound (A) and the activating compound (B), to prepare a propylene/olefin copolymer (b).

As the olefin of 4 to 20 carbon atoms, the aforesaid olefins can be employed.

The olefin used for the copolymerization of propylene is preferably ethylene or 1-butene. When ethylene or 1-butene is used, the resulting propylene/olefin copolymer (b) is lowered in the glass transition temperature and thus the polymer composition obtained is improved in the impact resistance. The copolymer of propylene and ethylene or 1-butene has improved compatibility with the propylene (co)polymer (a) obtained in the step (a) and the ethylene/olefin copolymer (c) obtained in step (c), and thus improves the impact resistance of the polymer composition.

In the step (b), the polymerization can be carried out in a liquid phase polymerization, e.g., a suspension polymerization, and a gas phase polymerization.

In the liquid phase polymerization, the inert hydrocarbon same as for the preparation of the catalyst described before, or the olefin itself can be used as a medium.

For the polymerization in the step (b), the transition metal compound (A) is desired to be used in an amount of usually $10^{-8}$ to $10^{-3}$ g·atom/liter, preferably $10^{-7}$ to $10^{-4}$ g·atom/liter, in terms of a concentration of the transition metal atom derived from the transition metal compound (A) in the polymerization system. If the component (B-1) is used as the activating compound (B), an atomic ratio of aluminum in the component (B-1) to the transition metal in the transition metal compound (A), (Al/transition metal), is in the range of usually 5 to 10,000, preferably 10 to 5,000. If the component (B-2) is used, an atomic ratio of aluminum in the component (B-2) to the transition metal in the transition metal compound (A), (Al/transition metal), is in the range of usually 5 to 10,000, preferably 10 to 5,000. If the component (B-3) is used, a molar ratio of the transition metal compound (A) to the component (B-3), (transition metal compound (A)/component (B-3)), is in the range of usually 0.01 to 10, preferably 0.5 to 5.

When the solid catalyst or the prepolymerized catalyst is used, a compound selected from the component (B-1), the component (B-2) and the component (B-3), all of which are not supported on a fine particle carrier, may be used in addition to the activating compound (B) supported on a fine particle carrier.

The polymerization temperature is desired to be in the range of usually −50° to 100° C., preferably 0° to 90° C., in the case of slurry polymerization; in the range of usually 0° to 250° C., preferably 20° to 200° C., in the case of liquid phase polymerization; and in the range of usually 0° to 120° C., preferably 20° to 100° C., in the case of gas phase polymerization. The polymerization pressure is in the range of usually atmospheric pressure to 100 kg/cm$^2$, preferably atmospheric pressure to 50 kg/cm$^2$.

The molecular weight of the resulting ethylene copolymer can be regulated by the use of hydrogen in the polymerization system or varying the polymerization temperature.

The propylene/olefin copolymer (b) prepared in the step (b) comprises constituent units derived from propylene in amounts exceeding 50 mol %, preferably more than 50 mol % and up to 75 mol %, more preferably more than 50 mol % and up to 65 mol %. If the propylene content is not more than 50 mol %, compatibility of the ethylene/olefin copolymer obtained in the step (c) with the propylene (co)polymer may be reduced, and thus impact resistance of the polymer composition obtained may be lowered. The copolymer (b) having a propylene content of more than 75 mol % may also result in a polymer composition having a reduced impact resistance. The propylene/olefin copolymer (b) has an intrinsic viscosity [η], as measured in decalin at 135° C., of 0.1 to 20 dl/g, preferably 1 to 10 dl/g, more preferably 3 to 10 dl/g. If the intrinsic viscosity [η] is less than 0.1 dl/g, impact resistance of the polymer composition obtained may also be lowered. If the intrinsic viscosity [η] exceeds 20 dl/g, moldability of the polymer composition obtained may be reduced. The propylene/olefin copolymer (b) is desired to have a glass transition temperature of higher than −70° C. and up to −10° C.

In the step (c), propylene is copolymerized with at least one olefin selected from olefins of 3 to 20 carbon atoms in the presence of an olefin polymerization catalyst comprising the transition metal compound (A) and the activating compound (B), to prepare an ethylene copolymer (c).

As the olefin of 3 to 20 carbon atoms, propylene and the aforesaid olefins of 4 to 20 carbon atoms can be employed.

The olefin used for the copolymerization of ethylene is preferably propylene or 1-butene, more preferably 1-butene. When 1-butene is used, the resulting ethylene/olefin copolymer (c) is lowered in the glass transition temperature and thus the polymer composition obtained is improved in the impact resistance.

In the step (c), the polymerization can be carried out in a liquid phase polymerization, e.g., a suspension polymerization, and a gas phase polymerization.

In the liquid phase polymerization, the inert hydrocarbon same as for the preparation of the catalyst described before, or the olefin itself can be used as a medium.

For the polymerization in the step (b), the transition metal compound (A) is desired to be used in an amount of usually $10^{-8}$ to $10^{-3}$ g·atom/liter, preferably $10^{-7}$ to $10^{-4}$ g·atom/liter, in terms of a concentration of the transition metal atom derived from the transition metal compound (A) in the polymerization system. If the component (B-1) is used as the activating compound (B), an atomic ratio of aluminum in the component (B-1) to the transition metal in the transition metal compound (A), (Al/transition metal), is in the range of usually 5 to 10,000, preferably 10 to 5,000. If the component (B-2) is used, an atomic ratio of aluminum in the component (B-2) to the transition metal in the transition metal compound (A), (Al/transition metal), is in the range of usually 5 to 10,000, preferably 10 to 5,000. If the component (B-3) is used, a molar ratio of the transition metal compound (A) to the component (B-3), (transition metal compound (A)/component (B-3)), is in the range of usually 0.01 to 10, preferably 0.5 to 5.

When the solid catalyst or the prepolymerized catalyst is used, a compound selected from the component (B-1), the component (B-2) and the component (B-3), all of which are not supported on a fine particle carrier, may be used in addition to the activating compound (B) supported on a fine particle carrier.

The polymerization temperature is desired to be in the range of usually −50° to 100° C. preferably 0° to 90° C., in the case of slurry polymerization; in the range of usually 0° to 250° C. preferably 20° to 200° C. in the case of liquid phase polymerization; and in the range of usually 0° to 120° C. preferably 20° to 100° C. in the case of gas phase polymerization. The polymerization pressure is in the range of usually atmospheric pressure to 100 kg/cm², preferably atmospheric pressure to 50 kg/cm².

The molecular weight of the resulting ethylene copolymer can be regulated by the use of hydrogen in the polymerization system or varying the polymerization temperature.

The ethylene/olefin copolymer (c) prepared in the step (c) comprises constituent units derived from propylene in amounts exceeding 50 mol %, preferably 55 to 90 mol %, more preferably 70 to 85 mol %. If the ethylen content is not more than 50 mol %, impact resistance of the polymer composition obtained may be lowered. The ethylene/olefin copolymer (c) has an intrinsic viscosity [η], as measured in decalin at 135° C., of 0.1 to 20 dl/g, preferably 1 to 10 dl/g, more preferably 2 to 5 dl/g. If the intrinsic viscosity [η] is less than 0.1 dl/g, impact resistance of the polymer composition obtained may also be lowered. If the intrinsic viscosity [η] exceeds 20 dl/g, moldability of the polymer composition obtained may be reduced. The ethylene/olefin copolymer (c) is desired to have a glass transition temperature of higher than −80° C. and up to −10° C.

According to the present invention, multistage polymerization including the steps (a), (b) and (c) may be carried out in any order, and each of the second and subsequent stage polymerizations is carried out in the presence of a polymer or polymers obtained in the preceding stage or stages, respectively, to prepare a propylene polymer composition.

In more detail, the multistage polymerization can be carried out as follows.

(1) The step (a) is first carried out in the presence of the transition metal compound (A) and the activating compound (B) to prepare a propylene (co)polymer (a), the step (b) is then carried out in the presence of the transition metal compound (A), the activating compound (B) and the propylene (co)polymer (a) to prepare an propylene/olefin copolymer (b), and further the step (c) is carried out in the presence of the transition metal compound (A), the activating compound (B), the propylene (co)polymer (a) and the propylene/olefin copolymer (b), to prepare an ethylene/olefin copolymer (c), whereby a propylene polymer composition is prepared.

(2) The step (a) is first carried out in the presence of the transition metal compound (A) and the activating compound (B) to prepare a propylene (co)polymer (a), the step (c) is then carried out in the presence of the transition metal compound (A), the activating compound (B) and the propylene (co)polymer (a) to prepare an ethylene/olefin copolymer (c), and further the step (b) is carried out in the presence of the transition metal compound (A), the activating compound (B), the propylene (co)polymer (a) and the ethylene/olefin copolymer (c), to prepare an ethylene/olefin copolymer (b), whereby a propylene polymer composition is prepared.

In the present invention, it is preferred that the step (a) is first carried out and then the steps (b) and (c) in any order, more preferably the step (a), the step (b) and the step (c) are carried out in this order. By the use of this order, aggromation of the resulting polymer particles or adhesion thereof to the reactor wall can be avoided due to their improved particle properties, so that the propylene polymer composition can be obtained under stable operating conditions.

Each of the steps is carried out in such a manner that the resulting propylene polymer composition contains the propylene (co)polymer (a) obtained in the step (a) in an amount of 20 to 90% by weight, preferably 30 to 80% by weight, the propylene/olefin copolymer (b) obtained in the step (b) in an amount of 5 to 75% by weight, preferably 5 to 50% by weight, and the ethylene/olefin copolymer (c) obtained in the step (c) in an amount of 5 to 75% by weight, preferably 10 to 50% by weight. If the content of the propyene (co)polymer (a) is less than 20% by weight, heat resistance may be reduced, whereas if this content is more than 90% by weight, impact resistance may be reduced. If the content of the propylene/olefin copolymer (b) is less than 5% by weight, impact resistance may be reduced due to decreased compatibiity of the ethylene/olefin copolymer (c) with the propylene (co)polymer (a), whereas if this content is more than 75% by weight, heat resistance may be reduced. If the content of the ethylene/olefin copolymer (c) is less than 5% by weight, impact resistance may be reduced, whereas if this content is more than 75% by weight, heat resistance may be reduced. The propylene polymer composition obtained has a melt flow rate, as measured at 230° C. under a load of 2.16 kg, of 0.01 to 500 g/10 min, preferably 0.1 to 200 g/10 min. If the melt flow rate is less than 0.01 g/10 min, moldability of the polymer composition may be reduced. If the melt flow rate exceeds 500 g/10 min, mechanical strength of the polymer composition may be lowered.

Particularly preferred embodiments of the first process for preparing a propylene polymer composition according to the invention are as follows.

(1) A process for preparing a propylene polymer composition, wherein the step (a) is carried out in the presence of an olefin polymerization catalyst comprising the transition metal compound (A) represented by the formula (II), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare a propylene-ethylene copolymer containing constituent units derived from propylene in amounts of 50 to 75 mol %, and the step (c) is further carried out in the presence of the above-mentioned olefin polymerization catalyst, the propylene homopolymer and the propylene-ethylene copolymer to prepare an ethylene-olefin copolymer containing constituent units derived from ethylene in amounts of 55 to 90 mol %.

(2) A process for preparing a propylene polymer composition, wherein the step (a) is carried out in the presence of an olefin polymerization catalyst comprising the translation metal compound (A) represented by the formula (II), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare propylene-1-butene copolymer containing constituent units derived from propylene in amounts of 50 to 75 mol %, and the step (e) is further carried out in the pesence of the above-mentioned olefin polymerization catalyst, the propylene homopolymer and the propylene-1-butene copolymer, to prepare an ethylene-olefin copolymer containing constituent units derived from ethylene in amounts of 55 to 90% by mol.

(3) A process for preparing a propylene polymer composition, wherein the step (a) is carried out in the presence of an olefin polymerization catalyst comprising the transition metal compound (A) represented by the formula (III), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare a propylene-ethylene copolymer containing constituent units derived from propylene in amounts of 50 to 75 mol %, and the step (c) is further carried out in the presence of the above-mentioned olefin polymerization catalyst, the propylene homopolymer and the propylene-ethylene copolymer, to prepare an ethylene-olefin copolymer containing constituent units derived from ethylene in amounts of 55 to 90 mol %.

(4) A proces for preparing a propylene polymer composition, wherein the step (a) is carried out in the presence of an olefin polymerization catalyst comprising the translation metal compound (A) represented by the formula (III), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare propylene-1-butene copolymer containing constituent units derived from propylene in amounts of 50 to 75 mol %, and the step (c) is further carried out in the pesence of the above-mentioned olefin polymerization catalyst, the propylene homopolymer and the propylene-1-butene copolymer, to prepare an ethylene-olefin copolymer containing constituent units derived from ethylene in amounts of 55 to 90% by mol.

Next, the second process for preparing a propylene polymer composition according to the invention is described.

According to the second process for preparing a propylene polymer composition of the present invention, multistage polymerization including the steps (a), (b), (d) and (e), which will be described later more in detail, is carried out in the presence of the olefin polymerization catalyst comprising the transition metal compound (A) and the activating compound (B), to prepare a propylene polymer composition. The polymerization steps may be carried out in any order, and each of the second and subsequent stage polymerizations is conducted in the presence of a polymer or polymers prepared in the preceding stage or stages, respectively.

The step (a) and the step (b) are the same as in the first process of the invention, respectively.

The olefin used for the copolymerization of propylene in the step (b) is preferably ethylene or 1-butene. When ethylene or 1-butene is used, the resulting propylene/olefin copolymer (b) is lowered in the glass transition temperature and thus the polymer composition obtained is improved in the impact resistance. The copolymer of propylene and ethylene or 1-butene has improved compatibility with the propylene (co)polymer (a) obtained in the step (a) and the ethylene/olefin copolymer (d) obtained in step (d), and thus improves the impact resistance of the polymer composition.

The propylene/olefin copolymer (b) prepared in the step (b) comprises constituent units derived from propylene in amounts exceeding 50 mol %, preferably more than 50 mol % and up to 75 mol %, more preferably more than 50 mol % and up to 65 mol %. Preferably, the propylene-olefin copolymer (b) comprises ethylene as the at least one olefin of 4 to 20 carbon atoms, i.e., is a propylene/ethylene copolyemr. If the propylene content is not more than 50 mol %, compatibility of the ethylene/olefin copolymer (d) with the propylene (co)polymer (a) may be reduced, and thus impact resistance may be lowered. The copolymer (b) having a propylene content of more than 75 mol % may also result in reduced impact resistance. The propylene/olefin copolymer (b) is preferably a random copolymer, and has an intrinsic viscosity [η], as measured in decalin at 135 C. of 0.1 to 20 dl/g, preferably 1 to 10 dl/g, more preferably 3 to 10 dl/g. If the intrinsic viscosity [η] is less than 0.1 dl/g, impact resistance of the polymer composition obtained may also be lowered. If the intrinsic viscosity [η] exceeds 20 dl/g, moldability of the polymer composition obtained may be reduced. The propylene/olefin copolymer (b) is desired to have a glass transition temperature of higher than −70° C. and up to −10° C.

In the step (d), ethylene is copolymerized with at least one olefin selected from olefins of 3 to 20 carbon atoms in the presence of an olefin polymerization catalyst comprising the transition metal compound (A) and the activating compound (B), to prepare a an ethylene/olefin copolymer (d).

As the olefin of 3 to 20 carbon atoms, propylene and the aforesaid olefins of 4 to 20 carbon atoms can be employed.

The olefin used for the copolymerization of ethylene is preferably propylene or 1-butene. When propylene or 1-butene is used, the resulting propylene/olefin copolymer (d) is lowered in the glass transition temperature and thus the polymer composition obtained is improved in the impact resistance.

In the step (d), the polymerization can be carried out in a liquid phase polymerization, e.g., a suspension polymerization, and a gas phase polymerization.

In the liquid phase polymerization, the inert hydrocarbon same as for the preparation of the catalyst described before, or the olefin itself can be used as a medium.

For the polymerization in the step (d), the transition metal compound (A) is desired to be used in an amount of usually $10^{-8}$ to $10^{-3}$ g·atom/liter, preferably $10^{-7}$ to $10^{-4}$ g·atom/liter, in terms of a concentration of the transition metal atom derived from the transition metal compound (A) in the polymerization system. If the component (B-1) is used as the activating compound (B), an atomic ratio of aluminum in the component (B-1) to the transition metal in the transition metal compound (A), (Al/transition metal), is in the range of usually 5 to 10,000, preferably 10 to 5,000. If the component (B-2) is used, an atomic ratio of aluminum in the component (B-2) to the transition metal in the transition metal compound (A), (Al/transition metal), is in the range of usually 5 to 10,000, preferably 10 to 5,000. If the component (B-3) is used, a molar ratio of the transition metal compound (A) to the component (B-3), (transition metal compound (A)/component (B-3)), is in the range of usually 0.01 to 10, preferably 0.5 to 5.

When the solid catalyst or the prepolymerized catalyst is used, a compound selected from the component (B-1), the component (B-2) and the component (B-3), all of which are not supported on a fine particle carrier, may be used in addition to the activating compound (B) supported on a fine particle carrier.

The polymerization temperature is desired to be in the range of usually −50° to 100° C. preferably 0° to 90° C., in the case of slurry polymerization; in the range of usually 0° to 250° C. preferably 20° to 200° C. in the case of liquid phase polymerization; and in the range of usually 0° to 120° C. preferably 20° to 100° C. in the case of gas phase polymerization. The polymerization pressure is in the range of usually atmospheric pressure to 100 kg/cm², preferably atmospheric pressure to 50 kg/cm².

The molecular weight of the resulting ethylene/olefin copolymer (d) can be regulated by the use of hydrogen in the polymerization system or varying the polymerization temperature.

The ethylene/olefin copolymer (d) prepared in the step (d) comprises constituent units derived from ethylene in amounts exceeding 50 mol % and up to 90 mol %, preferably 55 to 85 mol %, more preferably 70 to 85 mol %. If the ethylen content is not more than 50 mol %, or more than 90 mol %, impact resistance of the polymer composition obtained may be lowerd. The ethylene/olefin copolymer (d) has an intrinsic viscosity [η], as measured in decalin at 135° C. of 0.1 to 20 dl/g, preferably 1 to 10 dl/g, more preferably 2 to 5 dl/g. If the intrinsic viscosity [η] is less than 0.1 dl/g, impact resistance of the polymer composition obtained may also be lowered. The ethylene/olefin copolymer (d) is desired to have a glass transition temperature of higher than −80° C. and up to −10° C.

In the step (e), ethylene is copolymerized with at least one olefin selected from olefins of 3 to 20 carbon atoms in the presence of an olefin polymerization catalyst comprising the transition metal compound (A) and the activating compound (B), to prepare an ethylene/olefin copolymer (e).

As the olefin of 3 to 20 carbon atoms, propylene and the aforesaid olefins of 3 to 20 carbon atoms can be employed.

The olefin used for the copolymerization of ethylene is preferably 1-butene. When 1-butene is used, the resulting propylene/olefin copolymer (e) is lowered in the glass transition temperature and thus the polymer composition obtained is improved in the impact resistance.

In the step (e), the polymerization can be carried out in a liquid phase polymerization, e.g., a suspension polymerization, and a gas phase polymerization.

In the liquid phase polymerization, the inert hydrocarbon same as for the preparation of the catalyst described before, or the olefin itself can be used as a medium.

For the polymerization in the step (e), the transition metal compound (A) is desired to be used in an amount of usually $10^{-8}$ to $10^{-3}$ g·atom/liter, preferably $10^{-7}$ to $10^{-4}$ g·atom/liter, in terms of a concentration of the transition metal atom derived from the transition metal compound (A) in the polymerization system. If the component (B-1) is used as the activating compound (B), an atomic ratio of aluminum in the component (B-1) to the transition metal in the transition metal compound (A), (Al/transition metal), is in the range of usually 5 to 10,000, preferably 10 to 5,000. If the component (B-2) is used, an atomic ratio of aluminum in the component (B-2) to the transition metal in the transition metal compound (A), (Al/transition metal), is in the range of usually 5 to 10,000, preferably 10 to 5,000. If the component (B-3) is used, a molar ratio of the transition metal compound (A) to the component (B-3), (transition metal compound (A)/component (B-3)), is in the range of usually 0.01 to 10, preferably 0.5 to 5.

When the solid catalyst or the prepolymerized catalyst is used, a compound selected from the component (B-1), the component (B-2) and the component (B-3), all of which are not supported on a fine particle carrier, may be used in addition to the activating compound (B) supported on a fine particle carrier.

The polymerization temperature is desired to be in the range of usually −50° to 100° C. preferably 0° to 90° C. in the case of slurry polymerization; in the range of usually 0° to 250° C. preferably 20° to 200° C. in the case of liquid phase polymerization; and in the range of usually 0° to 120° C. preferably 20° to 100° C. in the case of gas phase polymerization. The polymerization pressure is in the range of usually atmospheric pressure to 100 kg/cm², preferably atmospheric pressure to 50 kg/cm².

The molecular weight of the resulting ethylene/olefin copolymer (e) can be regulated by the use of hydrogen in the polymerization system or varying the polymerization temperature.

The ethylene/olefin copolymer (e) prepared in the step (e) comprises constituent units derived from ethylene in amounts not less than 90 mol %, preferably 90 to 98 mol %, more preferably 90 to 95 mol %. If the ethylen content is less than 90 mol %, impact resistance of the polymer composition obtained may be lowerd. The ethylene/olefin copolymer (e) has an intrinsic viscosity [η], as measured in decalin at 135° C. of 0.1 to 20 dl/g, preferably 1 to 10 dl/g, more preferably 2 to 5 dl/g. If the intrinsic viscosity [η] is less than 0.1 dl/g, impact resistance of the polymer composition obtained may also be lowered. If the intrinsic viscosity [η] exceeds 20 dl/g, moldability of the polymer composition obtained may be reduced. The ethylene/olefin copolymer (e) is desired to have a crystallinity, as measured by X-ray diffractometry, of 10 to 70%, preferably 20 to 70%.

According to the present invention, multistage polymerization including the steps (a), (b), (d) and (e) may be carried out in any order, and each of the second and subsequent stage polymerizations are carried out in the presence of a polymer or polymers obtained in the preceding stage or stages, respectively, to prepare a propylene polymer composition.

In more detail, the multistage polymerization can be carried out as follows.

(1) The step (a) is first carried out in the presence of the transition metal compound (A) and the activating compound (B) to prepare a propylene (co)polymer (a), the step (b) is then carried out in the presence of the transition metal compound (A), the activating compound (B) and the propylene (co)polymer (a) to prepare propylene/olefin copolymer (b), the step (d) is further carried out in the presence of the transition metal compound (A), the activating compound (B), the propylene (co)polymer (a) and the propylene/olefin copolymer (b), to prepare an ethylene/olefin copolymer (d), and the step (e) is finally carried out in the presence of the transition compound (A), the activating compound (B), the propylene (co)polymer (a), the propylene/olefin copolymer (b) and the ethylene/olefin copolymer (d), to prepare an ethylene/olefin copolymer (e), whereby a propylene polymer composition is prepared.

(2) The step (a) is first carried out in the presence of the transition metal compound (A) and the activating compound (B) to prepare a propylene (co)polymer (a), the step (d) is then carried out in the presence of the transition metal compound (A), the activating compound (B) and the propylene (co)polymer (a) to prepare an ethylene/olefin copolymer (d), the step (b) is further carried out in the presence of the transition metal compound (A), the activating compound (B), the propylene (co)polymer (a) and the ethylene/olefin copolymer (d), to prepare a propylene/olefin copolymer (b), and the step (e) is finally carried out in the presence of the transition metal compound (A), the activating compound (B), the propylene (co)polymer (a), the propylene/olefin copolymer (b) and the ethylene/olefin copolyemr (d), to prepare an ethylene/olefin copolymer (e), whereby a propylene polymer composition is prepared.

In the present invention, it is preferred that the step (a) is first carried out and then the steps (b) ,(d) and (e) in any order, more preferably the step (a), the step (b), the step (d) and the step (e) are carried out in this order. When the step (a) is first carried out, a propylene polymer composition having excellent particle properties can be obtained. By the use of the order of the steps (a), (b), (d) and (e), aggromation of the resulting polymer particles or adhesion thereof to the reactor wall can be avoided due to their improved particle properties, so that the propylene polymer composition can be obtained under stable operating conditions.

Each of the steps is carried out in such a manner that the resulting propylene polymer composition contains the propylene (co)polymer (a) obtained in the step (a) in an amount of 20 to 85% by weight, preferably 30 to 80% by weight, the propylene/olefin copolymer (b) obtained in the step (b) in an amount of 5 to 75% by weight, preferably 5 to 50% by weight, the ethylene/olefin copolymer (d) obtained in the step (d) in an amount of 5 to 75% by weight, preferably 10 to 50% by weight, and the ethylene/olefin polymer (e) obtained in the step (e) in an amount of 5 to 30% by weight, preferably 5 to 20% by weight. If the content of the propyene (co)polymer (a) is less than 20% by weight, heat resistance may be reduced, whereas if this content is more than 85% by weight, impact resistance may be reduced. If the content of the propylene/olefin copolymer (b) is less than 5% by weight, impact resistance may be reduced due to decreased compatibility of the ethylene/olefin copolymer (c) with the propylene (co)polymer (a), whereas if this content is more than 75% by weight, heat resistance may be reduced. If the content of the ethylene/olefin copolymer (c) is less than 5% by weight, impact resistance may be reduced, whereas if this content is more than 75% by weight, heat resistance may be reduced. If the content of the ethylene/olefin copolymer (e) is less than 5% by weight, balance of impact resistance and rigidity may be reduced, whereas if this content is more than 30% by weight, impact resistance may be reduced. The propylene polymer composition obtained has a melt flow rate, as measured at 230° C. under a load of 2.16 kg, of 0.01 to 500 g/10 min, preferably 0.1 to 200 g/10 min. If the melt flow rate is less than 0.01 g/10 min, moldability of the polymer composition may be reduced. If the melt flow rate exceeds 500 g/10 min, mechanical strength of the polymer composition may be lowered.

Particularly preferred embodiments of the second process for preparing a propylene polymer composition according to the invention are as follows.

(1) A process for preparing a propylene polymer composition, wherein the step (a) is carried out in the presence of an olefin polymerization catalyst comprising the transition metal compound (A) represented by the formula (II), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare a propylene-ethylene copolymer containing constituent units derived from propylene in amounts of 50 to 75 mol %, the step (d) is further carried out in the presence of the above-mentioned olefin polymerization catalyst, the propylene homopolymer and the propylene-ethylene copolymer to prepare an ethylene-propylene copolymer containing constituent units derived from ethylene in amounts of 50 to 85 mol %, and the step (e) is finally carried out in the presence of the above-mentioned olefin polymerization catalyst, the propylene homopolymer, the propylene-ethylene copolymer and the ethylene-propylene copolymer, to prepare an ethylene-1-butene copolymer.

(2) A process for preparing a propylene polymer composition, wherein the step (a) is carried out in the presence of an olefin polymerization catalyst comprising the translation metal compound (A) represented by the formula (II), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare propylene-1-butene copolymer containing constituent units derived from propylene in amounts of 50 to 75 mol %, and step (d) is further carried out in the pesence of the above-mentioned olefin polymerization catalyst, the propylene homopolymer and the propylene-1-butene copolymer, to prepare an ethylene-propylene copolymer containing constituent units derived from ethylene in amounts of 55 to 85% by mol, and the step (e) is finally carried out in the presence of the above-mentioned olefin polymerization catalyst, the propylene homopolymer, the propylene-1-butene copolymer and the ethylene- propylene copolymer, to prepare an ethylene-1-butene copolymer.

(3) A process for preparing a propylene polymer composition, wherein the step (a) is carried out in the presence of an olefin polymerization catalyst comprising the transition metal compound (A) represented by the formula (III), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare a propylene-ethylene-1-butene terpolymer containing constituent units derived from propylene in amounts of 50 to 75 mol %, the step (d) is further carried out in the presence of the above-mentioned olefin polymerization catalyst, the propylene homopolymer and the propylene-ethylene-1-butene terpolymer, to prepare an ethylene-propylene copolymer containing constituent units derived from ethylene in amounts of 55 to 85 mol % and the step (e) is finally carried out in the presence of the above-mentioned olefin polymerization catalyst, the propylene homopolymer, the propylene-ethylene-1-butene terpolymer, to prepare an ethylene-1-butene copolymer.

(4) A process for preparing a propylene polymer composition, wherein the step (a) is carried out in the presence of an olefin polymerization catalyst comprising the translation metal compound (A) represented by the formula (III), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare propylene-1-butene copolymer containing constituent units derived from propylene in amounts of 50 to 75 mol %, the step (d) is further carried out in the pesence of the above-mentioned olefin polymerization catalyst, the propylene homopolymer and the propylene-1butene copolymer, to prepare an ethylene-propylene copolymer containing constituent units derived from ethylene in amounts of 55 to 85% by mol, and the step (e) is finally carried out in the presence of the above-mentioned olefin polymerization catalyst, the propylene homopolymer, the propylene-1-butene copolymer and the ethylene-propylene copolymer, to prepare a propylene-1-butene copolymer.

(5) A process for preparing a propylene polymer composition, wherein the step (a) is carried out in the presence of an olefin polymerization catalyst comprising the translation metal compound (A) represented by the formula (III), the organoaluminum oxy-compound (B-2), and optionally, the organoaluminum compound (B-1), to prepare a propylene homopolymer, the step (b) is then carried out in the presence of the above-mentioned olefin polymerization catalyst and the propylene homopolymer, to prepare propylene-ethylene copolymer containing constituent units derived from propylene in amounts of 50 to 75 mol %, the step (d) is further carried out in the pesence of the above-mentioned olefin polymerization catalyst, the propylene homopolymer and the propylene-ethylene copolymer, to prepare an ethylene-1-butene copolymer containing constituent units derived from ethylene in amounts of 55 to 85% by mol, and the step (e) is finally carried out in the presence of the above-mentioned olefin polymerization catalyst, the propylene homopolymer, the propylene-ethylene copolymer and the ethylene-1-butene copolymer, to prepare a ethylene-1-butene copolymer.

The propylene polymer composition obtained by the second process of the invention has well balanced properties among rigidity, heat resistance and impact resistance. Such propylene polymer composition is favorably used for various molded artifcles including films and sheets in many fields.

EFFECT OF THE INVENTION

The processes for preparing a propylene polymer composition according to the invention can prepare a propylene polymer composition which has well balanced properties among rigidity, heat resistance and impact resistance.

The propylene polyemer compositions according to the invention has well balanced properties among rigidity, heat resistance and impact resistance.

EXAMPLE

The present invention will be further described with reference to the following examples, but it should be construed that the invention is in no way limited to those examples.

In the following examples, properties of the propylene polymer composition were measured by the methods described below.

Flexural modulus (FM)
  Measured in accordance with ASTM D790.
  Specimen: 12.7 mm (width)×6.4 mm (thickness)×127 mm (length).
  Span: 100 mm.
  Flexural speed: 2 mm/min.
Izod Impact Strength (IZ)
  Measured in accordance with ASTM D256.
  Temperature: −30° C., 23° C.
  Specimen: 12.7 mm (width)×6.4 mm (thickness)×64 mm (length), mechanically notched.
Tensile Elongation at Break (EL)
  Measured in accordance with ASTM D638.
  Temperature: 23° C.
Heat Distortion Temperature (HDT)
  Measured in accordance with ASTM D648.
  Specimen: 12.7 mm (width)×6.4 mm (thickness)×127 mm (length).
Haze
  Measured in accordance with ASTM D1003-61.
Preparation Example 1
  Synthesis of rac-dimethylsilyl-bis(1-(2-n-propyl-4-(9-phenanthryl)indenyl)zirconium dichloride
  [Synthesis of 3-(2-bromophenyl)-2-n-propylpropionic acid]
  A 1-liter four-necked round flask (equipped with stirrer, Dimroth condenser, dropping funnel and thermometer) was charged with 37 g (330 mmol) of potassium t-butoxide, 32 ml (334 mmol) of N-methylpyrrolidone and 400 ml of toluene. Then, the flask was placed in an ice bath, and a solution obtained by dissolving 60.7 g (300 mmol) of diethyl n-propylmalonate in 50 ml of toluene dropwise added while stirring (dropping time: 30 minutes, reaction temperature: 5° to 10° C.). After the dropping was completed, the mixture was stirred at 45° C. for 30 minutes and then at 65° C. for 1 hour. Immediately after starting of the heating, the reaction solution turned cream-colored and heterogeneous.

Subsequently, in an ice bath, a solution obtained by dissolving 75 g (300 mmol) of 2-bromobenzyl bromide in 50 ml of toluene was dropwise added (dropping time: 30 minutes, reaction temperature: 5° to 15° C.). After the dropping was completed, the mixture was reacted at 65° C. for 30 minutes, and then heated under reflux for 1 hour. The color of the reaction mixture was gradually changed to gray. After the reaction mixture was allowed to stand for cooling, it was poured into 500 ml of water, and a 10% aqueous solution of sulfuric acid was added to adjust pH=1 The organic phases were separated, and the aqueous phase was extracted five times with 100 ml of toluene. The combined organic phases were washed four times with 200 ml of a saturated saline solution and dried over anhydrous $MgSO_4$, and the solvent was distilled off to obtain 114 g of a brown liquid concentrate.

A 2-liter four-necked round flask (equipped with stirrer, Dimroth condenser, dropping funnel and thermometer) was charged with the concentrate obtained above and 200 ml of methanol, and they were stirred. To the flask was added a solution obtained by dissolving 237 g of potassium hydroxide (content of potassium hydroxide: 85%, 3.59 mol) in 520 ml of methanol and 180 ml of water. Then, the flask was placed in an oil bath at 90° C., the mixture was refluxed for 5 hours, most of methanol was distilled off by an evaporator, and 500 ml of water was added to give a homogeneous solution to which, under ice cooling, a 10% aqueous solution of sulfuric acid was added to adjust pH=1, and a white solid precipitated was separated by filtration. Then, the organic phase was separated from the filtrate, and the aqueous phase was extracted six times with 200 ml of ether. The combined organic phases were dried over anhydrous $MgSO_4$, and the solvent was distilled off to obtain 94 g of an yellow white semisolid.

Subsequently, the semisolid was introduced to a 1-liter round flask, heated at 180° C. (oil bath temperature) for 10 minutes, and then cooled to obtain 78.0 g of the aimed product as a brown transparent liquid (yield: 96%) The properties of the product thus obtained are described below.

FD-MS: 270(M+), 272(M++2) NMR ($CDCl_3$, 90 MHz): δ=0.95(t, J=7.0 Hz, 3H, $CH_3$); 1.10–2.00 (m, 4H); 2.60–3.25 (m, 3H); 6.90–7.80 (m, 4H)

[Synthesis of 3-(bromophenyl)-2-n-propylpropionyl chloride]

A 500-ml three-necked round flask (equipped with stirrer tip, Dimroth condenser, thermometer and NaOH trap) was charged with 277 mmol of 3-(2-bromophenyl)-2-n-propylpropionic acid and 200 ml of thionyl chloride, and they were heated under reflux for 2 hours. After the thionyl chloride was distilled off by single distillation, a vacuum distillation gave 77.4 g of a crude product as a light brown transparent liquid having a boiling point of 130° to 135° C. 1 mmHg. This acid chloride was used for the next reaction without further purification.

[Synthesis of 4-bromo-2-n-propyl-1-indanone]

A 1-liter four-necked round flask (equipped with stirrer tip, Dimroth condenser, dropping funnel, thermometer and NaOH trap) was charged with 74.5 g (559 mmol) of anhydrous aluminum chloride and 400 ml of carbon disulfide. Under ice cooling, a solution obtained by dissolving the above acid chloride in 100 ml of carbon disulfide was dropwise added slowly. After the dropping was completed, the mixture was further reacted for 3 hours under ice cooling. Then, the reaction solution was poured into 600 ml of ice water to separate the organic phase, and the aqueous phase was extracted four times with 200 ml of ether. The combined organic phases were washed four times with 300 ml of a saturated sodium hydrogencarbonate solution and dried over anhydrous $MgSO_4$, and the solvent was distilled off to obtain 66.7 g of a brown liquid. This ketone was used for the next reaction without further purification.

[Synthesis of 4-bromo-2-n-propyl-1-trimethylsilyloxyindan]

A 1-liter four-necked round flask (equipped with stirrer tip, Dimroth condenser, dropping funnel and thermometer) was charged with 4.96 g (131 mmol) of sodium boron hydride and 300 ml of ethanol. Under ice cooling, a solution obtained by dissolving 4-bromo-2-n-propyl-1-indanone obtained above in 200 ml of ethanol was dropwise added. After the dropping was completed, the mixture was further reacted for 3 hours at room temperature. After the reaction, 200 ml of ice water was added, and most of methanol was distilled off by an evaporator. The residue was transferred into a separatory funnel with 300 ml of ether, the organic phase was separated, and the aqueous phase was extracted three times with 200 ml of ether. The combined organic phases were dried over anhydrous $MgSO_4$, and the solvent was distilled off to obtain 66.50 g of an yellow white powder.

Subsequently, a 1-liter four-necked round flask was charged with the yellow white powder obtained above, 200 ml of ether and 47 ml (337 mmol) of triethylamine. Under ice cooling, a solution obtained by dissolving 39 ml (307 mmol) of trimethylsilyl chloride in 50 ml of ether was dropwise added slowly. After the 7 hours reaction, the reaction mixture was poured into 400 ml of a saturated sodium hydrogencarbonate solution, the organic phase was separated, and the aqueous phase was extracted three times with 200 ml of ether. The combined organic phases were washed with 400 ml or a saturated saline solution and dried over anhydrous $MgSO_4$, the solvent was distilled off to obtain an yellow brown liquid. A vacuum distillation gave 76.00 g of the aimed product having a boiling point of 120° to 125° C./2 mmHg as a light yellow white transparent liquid. The yield summed up from 3-(2-bromophenyl)-2-n-propylpropionic acid was 81%.

[Synthesis of 2-n-propyl-4-(9-phenanthryl)indene]

A 300-ml four-necked round flask (equipped with stirrer tip, dropping funnel and thermometer) was charged with 10 g (30.5 mmol) of 4-bromo-2-n-propyl-1-trimethylsilyloxyindan obtained above, 50 ml of anhydrous ether and 112 mg (0.153 mmcl) of $PdCl_2$ (dppf). To the flask was then dropwise added slowly 42 ml (61 mmol) of a 1.45 molar 9-phenanthrylmagnesium bromide solution in ether/benzene, while stirring at room temperature. Thereafter, the internal temperature was elevated to 42° C., the reaction mixture was refluxed for 10 hours, poured into 300 ml of a saturated aqueous solution of ammonium chloride and extracted four times with 200 ml of ether. The combined organic phases were washed with a saturated saline solution and dried over anhydrous $MgSO_4$, and the solvent was distilled off to obtain 20.32 g of a brown liquid.

A 300-ml four-necked round flask was charged with the brown liquid obtained above and 50 ml of ether, and 60 ml of a 5N aqueous solution of hydrochloric acid was dropwise added at room temperature, followed by vigorous stirring.

After 6.5 hours, the reaction solution was transferred into a separatory funnel, extracted four times with 50 ml of ether, the combined organic phases were washed twice with 100 ml of a saturated sodium hydrogencarbonate solution and dried over anhydrous MgSO$_4$, and the solvent was distilled off to obtain a brown semisolid which was purified by silica gel chromatography to obtain 10.75 g of an yellow powder.

Subsequently, a 200-ml four-necked round flask was charged with the yellow powder obtained above, 80 ml of anhydrous methylene chloride, 12.8 ml (92.0 mmol) of triethylamine and 187 ml (1.53 mmol) of 4-dimethylaminopyridine. Under ice cooling, a solution obtained by dissolving 4.72 ml (61.0 mmol) of methanesulfonyl chloride in 20 ml of anhydrous methylene chloride was dropwise added slowly. After the dropping was completed, the temperature of the mixture was elevated to room temperature and then the reaction was carried out for 4 hours. The reaction mixture was poured into 100 ml of ice water, extracted three times with 100 ml of methylene chloride, the combined organic phases were washed three times with 100 ml of a saturated sodium hydrogencarbonate solution and dried over anhydrous MgSO$_4$. Then, the solvent was distilled off to obtain a red brown semisolid which was purified by silica gel chromatography to obtain 7.20 g of the aimed product as an yellow white powder (yield: 71%). The properties of the product thus obtained are described below.

NMR (CDCl$_3$, 90 MHz):
δ = 0.92 (t, J = 7.0 Hz, 3H, CH$_3$);
1.50 (m, 2H);
2.36 (t, J = 7.0 Hz, 2H);
3.02 (bd, 2H);
6.60 (s, 1H);
7.05–9.00 (m, 12H)

[Synthesis of dimethylsilylene-bis{1-(2-n-propyl-4-(9-phenanthryl)indene)}]

A 300-ml four-necked round flask (equipped with stirrer tip, Dimroth condenser, dropping funnel and thermometer) was charged with 6.20 g (18.5 mmol) of the 2-n-propyl-4-(9-phenanthryl) indene obtained above, 120 ml of anhydrous ether and 50 mg of copper cyanide. Under ice cooling, 12.5 ml (20.4 mmol) of a 1.63 molar n-butyllithium in hexane was dropwise added. After the dropping was completed, the content in the flask was refluxed for 1.5 hours. Then, under ice cooling, a solution of 1.34 ml (11.1 mmol) of dimethyldichlorosilane in 10 ml of anhydrous ether was dropwise added slowly. After the dropping was completed, the reaction was carried out overnight at room temperature, and then the reaction mixture was poured into 200 ml of a saturated aqueous ammonium chloride. After filtration, the filtrate was extracted three times with 100 ml of ether, the organic phase was washed with 200 ml of a saturated saline solution and dried over anhydrous MgSO$_4$, and the solvent was distilled off to obtain an yellow white powder which was purified by silica gel chromatography to obtain 3.80 g of the aimed product as an yellow white powder (yield: 54%). The properties of the product thus obtained are described below.

NMR (CDCl$_3$, 90 MHz):
δ = −0.17, −0.15 (each: s, together 6H, Si—CH$_3$);
0.65–2.75 (m, 14H);
3.86–4.25 (m, 2H, —CH—Si);
6.25, 6.34 (each: 6d, 2H);
7.05–9.05 (m, 24H)

[synthesis of rac-dimethylsilyl-bis{1-(2-n-propyl-4-(9-phenanthryl) indenyl)}zirconium dichloride]

A 200-ml four-necked round flask (equipped with stirrer tip, bead condenser, dropping funnel and thermometer) was charged with 2.9 g (4.00 mmol) of dimethylsilyl-bis{1-(2-n-propyl-4-(9-phenanthryl)indene)} and 60 ml of anhydrous ether. Under ice cooling, 5.15 ml (8.40 mmol) of a 1.63 molar n-butyllithium in hexane was dropwise added slowly. After the dropping was completed, the content in the flask was stirred overnight at room temperature, and 1.00 g (4.29 mmol) of ZrCl$_4$ was added in portions at −78° C. After the addition was completed, the mixture was allowed to stand overnight to elevated the temperature. The resulting orange reaction slurry was filtered, the filter cake was washed with 100 ml of anhydrous methylene chloride, and the fltrate was concentrated to dryness. The resulting product was redissolved in 100 ml of anhydrous methylene chloride, and anhydrous ether was added to the solution. The solid precipitated was filtered, washed with 15 ml of anhydrous ether and dried under reduced pressure to obtain 0.10 g of the aimed product as an yellow powder (yield: 2.8%). The properties of the product thus obtained are described below.

NMR (CDCl$_3$, 90 MHz):
δ = 0.80 (t, J = 7.4 Hz, 6H, CH$_3$);
1.39 (s, 6H, Si—CH$_3$);
1.10–3.00 (m, 8H);
6.61 (s, 2H, 3-H-Ind);
7.00–9.10 (m, 24 H)

EXAMPLE 1

[Preparation of solid aluminoxane component (a)]

A 300-ml pressure-reducible reactor equipped with a stirrer was charged with 67 ml of a toluene solution containing methylaluminoxane corresponding to 100 mmol of aluminum atom (methylaluminoxane available from Shelling Co.), and then added 100 ml of purified n-decane at room temperature over a period of about 0.5 hour with stirring, to precipitate methylaluminoxane. Then, toluene was removed from the reactor by elevating the temperature in the reactor to 35° C. over a period of about 3 hours under a reduced internal pressure of 4 Torr using a vacuum pump, to further precipitate aluminoxane. The reaction solution was filtered to remove the liquid phase, and the solid was resuspended in n-decane to obtain an aluminoxane suspension containing 0.18 mmol-Al/ml [solid aluminoxane component (a)].

[Preparation of solid catalyst component (b-1)]

A 400-ml reactor thoroughly purged with nitrogen was charged with 100 ml of n-hexane, and 10.5 mmol (in terms of Al atom) of the solid aluminoxane component (a) obtained above and 0.07 mmol (in terms of Zr atom) of rac-dimethylsilyl-bis{1-(2-n-propyl-4-(9-phenanthryl) indenyl)}zirconium dichloride, and then the mixture was stirred for 20 minutes. 100 ml of n-hexane and 0.9 mmol of triisobutylaluminum were added, followed by stirring for 10 minutes. Then, a propylene gas was passed through the reactor at 20° C. for 4 hours at a rate of 2.2 1/hr to prepolymerize propylene. The supernatant was removed by decantation, and the remainder was washed three times with 150 ml of decane. As a result, a solid catalyst component (b-1) in which Zr and Al were supported in amounts of 0.010 mmol and 4.3 mmol, respectively, based on 1 g of the solid catalyst was obtained.

[Polymerization]

A 2-liter stainless steel autoclave was charged with 500 g of propylene and 4.5 liters of hydrogen at room temperature, and the temperature was elevated to 40° C. Then, 0.5 mmol of triisobutylaluminum and 0.004 mmol (in terms of Zr atom) of the solid catalyst component (b-1) obtained above were added, to polymerize propylene at 50° C. for 25 minutes.

Subsequently, the internal pressure was released to atmospheric pressure, and nitrogen was passed through the system for about 10 minutes to purge the system. During this procedure, 5.1 g of a polymer produced was taken out of the system by means of a specially devised sampler.

Then, 120 ml of hydrogen and an ethylene/propylene mixed gas (ethylene: 24 mol %, propylene: 76 mol %) were fed to the system so that the total pressure became 7 kg/cm$^2$. The polymerization was carried out at 50° C. for 10 minutes, while keeping the total pressure at 7 kg/cm$^2$ by continuous feeding the mixed gas.

After the internal pressure was released, 4.7 g of a polymer produced was taken out of the system while purging with nitrogen in the manner as described above. Thereafter, 0.25 mmol of triisobutylaluminum was added to the system, and 60 ml of hydrogen and an ethylene/propylene mixed gas (ethylene: 45% by mol, propylene: 55% by mol) were fed to the system so that the total pressure became 7 kg/cm$^2$. The polymerization was carried out at 50° C. for 10 minutes, while keeping the total pressure at 7 kg/cm$^2$ by continuous feeding the mixed gas. After the reaction was completed, the internal pressure was released to atmospheric pressure, giving 149 g of a white powdery polymer.

The propylene homopolymer obtained in the first stage had a melting point of 161° C. and MFR of 13.5 g/10 min. The propylene-ethylene copolymer obtained in the second stage had a propylene content of 59 by mol % and an intrinsic viscosity [η] of 3.1 dl/g. The ethylene-propylene copolymer obtained in the third stage had an ethylene content of 80 mol % and an intrinsic viscosity [η] of 2.5 dl/g.

The resulting propylene polymer composition contained the propylene homopolymer in an amount of 77.8% by weight, the propylene-ethylene copolymer in an amount of 9.6% by weight and the ethylene-propylene copolymer in an amount of 12.6% by weight, and the composition had MFR of 10 g/10 min, IZ at 23° C. of 40 kg·cm/cm, IZ at –30° C. of 4.6 kg·cm/cm, FM of 12,700 kg/cm$^2$, EL of 560% and HDT of 100° C.

The amount, the composition, etc. of the polymer obtained in each stage were determined in the following manner. The melting point and MFR of the propylene homopolymer (P-1) obtained in the first stage were measured for a polymer (A-1) sampled after completion of the first stage polymerization. Further, a polymer (A-2) sampled after completion of the second stage polymerization was immersed in 200 ml of boiling n-decane for 5 hours to dissolve the polymer and then cooled to room temperature to precipitate a solid which was filtered through a glass filter, then dried and measured on its weight. An NMR analysis on this dried solid proved that the ethylene content was lower than the lower limit of detection. Accordingly, a percent weight of the dried solid (i.e., the n-decane-insoluble portion at room temperature) to the weight of the polymer (A-2), can be taken as the % by weight of the propylene homopolymer (P-1). The n-decane-soluble portion in the polymer (A-1) was not more than 0.1% by weight. On the other hand, the filtrate obtained by the above filtration of the polymer (A-2) was added to a large amount of methanol to precipitate a solid which was washed with methanol and dried to obtain a n-decane-soluble portion, which was taken as the propylene-ethylene copolymer (P-2) obtained in the second stage. This solid was measured on the intrinsic viscosity and the composition in accordance with a conventional NMR method. Further, a polymer (A-3) sampled after completion of the third stage polymerization was subjected to the same fractionation operation as described for the polymer (A-2). The proportion of the ethylene-propylene copolymer (P-3) obtained in the third stage was determined by subtracting the percent weight values of the propylene homopolymer (P-1) and the propylene-ethylene copolymer (P-2) from the percent weight value of the n-decane-soluble portion of the polymer (A-3). The intrinsic viscosity and the composition of the ethylene-propylene copolymer (P-3) were calculated with reference to the analytical values of the n-decane-soluble portion of the polymer (A-3) and the analytical values of the propylene-ethylene copolymer (P-2).

In Example 2 to 4 below, the properties, compositions, etc. of a polymer prepared in each stage were determined as described above.

EXAMPLE 1

[Polymerization]

A 2-liter stainless steel autoclave was charged with 500 g of propylene and 4.5 liters of hydrogen at room temperature, and the temperature was elevated to 40° C. Then, 0.5 mmol of triisobutylaluminum and 0.004 mmol (in terms of zirconium atom) of the solid catalyst component (b-1) prepared in Example 1 were added, and the polymerization was carried out at 50° C. for 25 minutes.

Subsequently, the internal pressure was released to atmospheric pressure, and nitrogen was passed through the system for about 10 minutes to purge the system. During this procedure, 4.5 g of a polymer produced was taken out of the system by means of a specially devised sampler.

Then, 120 ml of hydrogen and an ethylene/propylene mixed gas (ethylene: 20% by mol, propylene: 80% by mol) were fed to the system so that the total pressure became 7 kg/cm$^2$. The polymerization was carried out at 50° C. for 10 minutes, while keeping the total pressure at 7 kg/cm$^2$ by continuous feeding the mixed gas.

After the internal pressure was released, 5.0 g of a polymer produced was taken out of the system while purging with nitrogen in the manner as described above. Thereafter, 0.25 mmol of triisobutylaluminum was added to the system, and 100 ml of hydrogen and an ethylene/1-butene mixed gas (ethylene: 35% by mol, 1-butene: 65% by mol) were fed to the system so that the total pressure became 7 kg/cm$^2$. The polymerization was carried out at 50° C. for 10 minutes, while keeping the total pressure at 7 kg/cm$^2$ by continuous feeding the mixed gas. After the reaction was completed, the pressure was released to atmospheric pressure, giving 156 g of a white powdery polymer.

The propylene homopolymer obtained in the first stage had a melting point of 161° C. and MFR of 13.5 g/10 min. The propylene-ethylene copolymer obtained in the second stage had a propylene content of 59% by mol and an intrinsic viscosity [η] of 3.0 dl/g. The ethylene-1-butene copolymer obtained in the third stage had an ethylene content of 81% by mol and an intrinsic viscosity [η] of 2.3 dl/g.

The resulting propylene polymer composition contained the propylene homopolymer in an amount of 78.3% by weight, the propylene-ethylene copolymer in an amount of 11.6% by weight and the ethylene-1-butene copolymer in an amount of 10.1% by weight, and had MFR of 13 g/10 min, IZ at 23° C. of 55 kg·cm/cm, IZ at -30° C. of 6 kg·cm/cm, FM of 12,300 kg/cm$^2$, EL of 600% and HDT of 100° C.

EXAMPLE 3

[Polymerization]

A 2-liter stainless steel autoclave was chaged with 500 g of propylene and 4.5 liter of hydrogen at room temperature, and the temperature was elevated to 40° C. Then, 0.5 mmol of triisobutylaluminum and 0.004 mmol (in terms of zirconium atom) of the solid catalyst component (b-1) prepared in Example 1 were added, and the polymerization was carried out at 50° C. for 25 minutes.

Subsequently, the internal pressure was released to atmospheric pressure, and nitrogen was passed through the system for about 10 minutes to purge the system. During this procedure, 4.8 g of a polymer produced was taken out of the system by means of a specially devised sampler.

Then, 120 ml of hydrogen and an ethylene/propylene mixed gas (ethylene: 20% by mol, propylene: 80% by mol) were fed to the system so that the total pressure became 7 kg/cm$^2$. The polymerization was carried out at 50° C. for 10 minutes, while keeping the total pressure at 7 kg/cm$^2$ by continuous feeding the mixed gas.

After the internal pressure was released, 4.4 g of a polymer produced was taken out of the system while purging with nitrogen in the manner as described above. Thereafter, 0.25 mmol of triisobutylaluminum was added to the system, then 60 ml of hydrogen and 70 ml of 1-octene were fed, and ethylene was further fed so that the total pressure became 8 kg/cm$^2$. The polymerization was carried out at 80° C. for 30 minutes, while keeping the total pressure at 8 kg/cm$^2$ by continuous feeding ethylene. After the reaction was completed, the pressure was released to atmospheric pressure, and the product was dried under reduced pressure, giving 150 g of a white powdery polymer.

The propylene homopolymer obtained in the first stage had a melting point of 161° C. and MFR of 13.5 g/10 min. The propylene-ethylene copolymer obtained in the second stage had a propylene content of 59% by mol and an intrinsic viscosity [η] of 3.0 dl/g. The ethylene-1-octene copolymer obtained in the third stage had an ethylene content of 82% by mol and an intrinsic viscosity [η] of 2.4 dl/g.

The resulting propylene polymer composition contained the propylene homopolymer in an amount of 78.7% by weight, the propylene-ethylene copolymer in an amount of 12.1% by weight and the ethylene-1-octene copolymer in an amount of 9.2% by weight, and had MFR of 12 g/10 min, IZ at 23° C. of 62 kg·cm/cm, IZ at −30° C. of 6.8 kg−cm/cm, FM of 12,000 kg/cm$^2$, EL of 800% and HDT of 100° C.

EXAMPLE 4

[Preparation of solid catalyst component (b-2)]

A 400-ml reactor thoroughly purged with nitrogen was charged with 100 ml of n-hexane, and 10.5 mmol (in terms of Al atom) of the solid aluminoxane component (a) obtained in Example 1 and 0.07 mmol (in terms of Zr atom) of rac-dimethylsilyl-bis{1-(2-methyl-4-(phenyl)indenyl)}zirconium dichloride was added and then the mixture was stirred for 20 minutes. 100 ml of n-hexane and 0.9 mmol of triisobutylaluminum were added, followed by stirring for 10 minutes. Then, a propylene gas was passed through the reactor at 20° C. for 4 hours at a rate of 2.2 l/hr to prepolymerize propylene. The supernatant was removed by decantation, and the remainder was washed three times with 150 ml of decane. As a result, a solid catalyst component (b-2) in which Zr and Al were supported in amounts of 0.010 mmol and 4.3 mmol, respectively, based on 1 g of the solid catalyst was obtained.

[Polymerization]

A 2-liter stainless steel autoclave was charged with 500 g of propylene and 0.8 liters of hydrogen at room temperature, and the temperature was elevated to 40° C. Then, 0.5 mmol of triisobutylaluminum and 0.004 mmol (in terms of Zr atom) of the solid catalyst component (b-2) obtained above were added, to polymerize propylene at 50° C. for 25 minutes.

Subsequently, the internal pressure was released to atmospheric pressure, and nitrogen was passed through the system for about 10 minutes to purge the system. During this procedure, 4.7 g of a polymer produced was taken out of the system by means of a specially devised sampler.

Then, an ethylene/propylene mixed gas (ethylene: 20 mol %, propylene: 80 mol %) were fed to the system so that the total pressure became 7 kg/cm$^2$. The polymerization was carried out at 50° C. for 10 minutes, while keeping the total pressure at 7 kg/cm$^2$ by continuous feeding the mixed gas.

After the internal pressure was released, 4.2 g of a polymer produced was taken out of the system while purging with nitrogen in the manner as described above. Then, 0.25 mmol of triisobutylaluminum and 60 ml of 1-butene was added, and ethylene was fed to the system so that the total pressure became 8 kg/cm$^2$. The polymerization was carried out at 80° C. for 60 minutes, while keeping the total pressure at 8 kg/cm$^2$ by continuous feeding ethylene. After the reaction was completed, the pressure was released to atmospheric pressure, giving 158 g of a white powdery polymer.

The propylene homopolymer obtained in the first stage had a melting point of 156° C. and MFR of 6.0 g/10 min. The propylene-ethylene copolymer obtained in the second stage had a propylene content of 58 mol % and an intrinsic viscosity [η] of 2.1 dl/g. The ethylene-1-butene copolymer obtained in the third stage had an ethylene content of 82 mol % and an intrinsic viscosity [η] of 2.7 dl/g.

The resulting propylene polymer composition contained the propylene homopolymer in an amount of 76.0% by weight, the propylene-ethylene copolymer in an amount of 13.3% by weight and the ethylene-1-butene copolymer in an amount of 10.7% by weight, and had MFR of 3.4 g/10 min, IZ at 23° C. of 35 kg·cm/cm, IZ at −30° C. of 4.2 kg·cm/cm, FM of 12,300 kg/cm$^2$, EL of 520% and HDT of 100° C.

EXAMPLE 5

[Polymerization]

A 2-liter stainless steel autoclave was charged with 500 g of propylene and 4.5 liter of hydrogen at room temperature, and the temperature was elevated to 40° C. Then, 0.5 mmol of triisobutylaluminum and 0.004 mmol (in terms of zirconium atom) of the above solid catalyst component (b-1) prepared in Example 1 were added, and the polymerization was carried out at 50° C. for 25 minutes.

Subsequently, the internal pressure was released to atmospheric pressure, and nitrogen was passed through the system for about 10 minutes to purge the system. During this procedure, 5.1 g of a polymer produced was taken out of the system by means of a specially devised sampler.

Then, 120 ml of hydrogen and an ethylene/propylene mixed gas (ethylene: 20% by mol, propylene: 80% by mol) were fed to the system so that the total pressure became 7 kg/cm$^2$. The polymerization was carried out at 50° C. for 10 minutes, while keeping the total pressure at 7 kg/cm$^2$ by continuous feeding the mixed gas.

After the internal pressure was released, 4.7 g of a polymer produced was taken out of the system while purging with nitrogen in the manner as described above. Thereafter, 0.25 mmol of triisobutylaluminum was added to the system, and 60 ml of hydrogen and an ethylene/propylene mixed gas (ethylene: 45% by mol, propylene: 55% by mol) were fed so that the total pressure became 7 kg/cm$^2$. The polymerization was carried out at 50° C. for 10 minutes, while keeping the total pressure at 7 kg/cm$^2$ by continuous feeding the mixed gas.

After the pressure was released, 5.3 g of a polymer produced was taken out of the system while purging with nitrogen in the manner as described above. Thereafter, to the system was fed 300 ml of hydrogen and was further fed an ethylene/1-butene mixed gas (ethylene: 75% by mol, 1-butene: 25% by mol) so that the total pressure became 7 kg/cm$^2$. The polymerization was carried out at 50° C. for 7 minutes, while keeping the total pressure at 7 kg/cm$^2$ by continuous feeding the mixed gas. After the reaction was completed, the pressure was released to atmospheric pressure, giving 175 g of a white powdery polymer.

The propylene homopolymer obtained in the first stage had a melting point of 161° C. and MFR of 13.5 g/10 min. The propylene-ethylene copolymer obtained in the second stage had a propylene content of 40% by mol and an intrinsic viscosity [η] of 4.0 dl/g. The ethylenepropylene copolymer obtained in the third stage had an ethylene content of 78% by mol and an intrinsic viscosity [η] of 2.7 dl/g. The ethylene-1-butene copolymer obtained in the fourth stage had an ethylene content of 95% by mol and an intrinsic viscosity [η] of 1.5 dl/g.

The resulting propylene polymer composition contained the propylene homopolymer in an amount of 71.2% by weight, the propylene-ethylene copolymer in an amount of 7.5% by weight, the ethylene-propylene copolymer in an amount of 12.0% by weight and the ethylene-1-butene copolymer in an amount of 9.3% by weight, and had MFR of 10 g/10 min, IZ at 23° C. of 38 kg·cm/cm, IZ at –30° C. of 4.8 kg·cm/cm, FM of 13,500 kg/cm$^2$, EL of 360% and HDT of 105° C.

The amount, the composition, etc. of the polymer obtained in each stage were determined in the following manner. The melting point and MFR of the propylene homopolymer (P-1) obtained in the first stage were measured for a polymer (A-1) sampled after completion of the first stage polymerization. Further, a polymer (A-2) sampled after completion of the second stage polymerization was immersed in 200 ml of boiling n-decane for 5 hours to dissolve the polymer and then cooled to room temperature to precipitate a solid which was filtered through a glass filter, then dried and measured on its weight. An NMR analysis on this dried solid proved that the ethylene content was lower than the lower limit of detection. Accordingly, a percent weight of the dried solid (i.e., the n-decane-insoluble portion at room temperature) to the weight of the polymer (A-2), can be taken as the % by weight of the propylene homopolymer (P-1). The n-decane-soluble portion in the polymer (A-1) was not more than 0.1% by weight. On the other hand, the filtrate obtained by the above filtration of the polymer (A-2) was added to a large amount of methanol to precipitate a solid which was washed with methanol and dried to obtain a n-decane-soluble portion, which was taken as the propylene-ethylene copolymer (P-2) obtained in the second stage. This solid was measured on the intrinsic viscosity and the composition in accordance with a conventional NMR method. Further, a polymer (A-3) sampled after completion of the third stage polymerization was subjected to the same fractionation operation as described for the polymer (A-2). The proportion of the ethylene-propylene copolymer (P-3) obtained in the third stage was determined by subtracting the percent weight values of the propylene homopolymer (P-1) and the propylene-ethylene copolymer (P-2) from the percent weight value of the n-decane-soluble portion of the polymer (A-3). The intrinsic viscosity and the composition of the ethylene-propylene copolymer (P-3) were calculated with reference to the analytical values of the n-decane-soluble portion of the polymer (A-3) and the analytical values of the propylene-ethylene copolymer (P-2). Furthermore, a polymer (A-4) sampled after completion of the fourth stage polymerization was also subjected to the same fractionation operation as described for the polymers (A-2) and (A-3). From the fact that the intrinsic viscosity and the ethylene content of the n-decane-soluble portion of the polymer (A-4) were the same as those of the polymer (A-3), it could be said that the ethylene-1-butene copolymer (P-4) obtained in the fourth stage was all included in the n-decane-insoluble portion of the polymer (A-4). The weight, the intrinsic viscosity and the ethylene content of the n-decane-insoluble portion were measured and referred to with those of the propylene homopolymer (P-1), whereby the amount (% by weight), the intrinsic viscosity and the ethylene content of the ethylene-1-butene copolymer (P-4) were calculated.

In Examples 6 to 8 below, the properties, compositions, etc. of a polymer prepared in each stage were determined as described above.

EXAMPLE 6

[polymerization]

A 2-liter stainless steel autoclave was charged with 500 g of propylene and 4.5 liters of hydrogen at room temperature, and the temperature was elevated to 40° C. Then, 0.5 mmol of triisobutylaluminum and 0.004 mmol (in terms of zirconium atom) of the solid catalyst component (b-1) prepared in Example 1 were added, and the polymerization was carried out at 5020 C. for 25 minutes.

Subsequently, the internal pressure was released to atmospheric pressure, and nitrogen was passed through the system for about 10 minutes to purge the system. During this procedure, 5.8 g of a polymer produced was taken out of the system by means of a specially devised sampler.

Then, 120 ml of hydrogen and an ethylene/propylene mixed gas (ethylene: 20% by mol, propylene: 80% by mol) were fed to the system so that the total pressure became 7 kg/cm$^2$. The polymerization was carried out at 50° C. for 10 minutes, while keeping the total pressure at 7 kg/cm$^2$ by continuous feeding the mixed gas.

After the internal pressure released, 5.0 g of a polymer produced was taken out of the system while purging with nitrogen in the manner as described above. Thereafter, 0.25 mmol of triisobutylaluminum was added to the system, and 60 ml of hydrogen and an ethylene/1-butene mixed gas (ethylene: 34% by mol, 1-butene: 66% by mol) were fed to the system so that the total pressure became 7 kg/cm$^2$. The polymerization was carried out at 50° C. for 10 minutes, while keeping the total pressure at 7 kg/cm$^2$ by continuous feeding the mixed gas.

After the pressure was released, 5.3 g of a polymer produced was taken out of the system while purging with nitrogen in the manner as described above. Thereafter, 300 ml of hydrogen and then an ethylene/1-butene mixed gas (ethylene: 73% by mol, 1-butene: 27% by mol) was fed so that the total pressure became 7 kg/cm$^2$. The polymerization was carried out at 50° C. for 7 minutes, while keeping the total pressure at 7 kg/cm$^2$ by continuous feeding the mixed gas. After the reaction was completed, the pressure was released to atmospheric pressure, giving 155 g of a white powdery polymer.

The propylene honiopolymer obtained in the first stage had a melting point of 161° C. and MFR of 13.5 g/10 min. The propylene-ethylene copolymer obtained in the second stage had a propylene content of 59% by mol and an intrinsic viscosity [η] of 3.8 dl/g. The ethylene-1-butene copolymer obtained in the third stage had an ethylene content of 79% by mol and an intrinsic viscosity [η] of 2.1 dl/g. The ethylene-1-butene copolymer obtained in the fourth stage had an ethylene content of 93% by mol and an intrinsic viscosity [η] of 1.6 dl/g.

The resulting propylene polymer composition contained the propylene homopolymer in an amount of 71.2% by weight, the propylene-ethylene copolymer in an amount of 7.5% by weight, the ethylene-1-butene copolymer obtained in the third stage in an amount of 13.2% by weight and the ethylene-1-butene copolymer obtained in the fourth stage in an amount of 8.1% by weight, and had MFR of 15 g/10 min, IZ at 23° C. of 40 kg·cm/cm, IZ at −30° C. of 5.8 kg·cm/cm, FM of 14,500 kg/cm², EL of 420% and HDT of 105° C.

EXAMPLE 7

[Polymerization]

A 2-liter stainless steel autoclave was chaged with 500 g of propylene and 4.5 liter of hydrogen at room temperature, and the temperature was elevated to 40° C. Then, 0.5 mmol of triisobutylaluminum and 0.004 mmol (in terms of zirconium atom) of the solid catalyst component (b-1) prepared in Example 1 were added, and the polymerization was carried out at 50° C. for 25 minutes.

Subsequently, the internal pressure was released to atmospheric pressure, and nitrogen was passed through the system for about 10 minutes to purge the system. During this procedure, 4.6 g of a polymer produced was taken out of the system by means of a specially devised sampler.

Then, 120 ml of hydrogen and an ethylene/propylene mixed gas (ethylene: 20% by mol, propylene: 80% by mol) were fed to the system so that the total pressure became 7 kg/cm². The polymerization was carried out at 50° C. for 10 minutes, while keeping the total pressure at 7 kg/cm² by continuous feeding the mixed gas.

After the internal pressure was released, 4.7 g of a polymer produced was taken out of the system while purging with nitrogen in the manner as described above. Thereafter, 0.25 mmol of triisobutylaluminum was added to the system, then 60 ml of hydrogen and 75 ml of 1-octene were fed, and ethylene was further fed so that the total pressure became 8 kg/cm². The polymerization was carried out at 80° C. for 30 minutes, while keeping the total pressure at 8 kg/cm² by continuous feeding ethylene.

After the pressure was released, 5.3 g of a polymer produced was taken out of the system while purging with nitrogen in the manner as described above. Thereafter, 300 ml of hydrogen and an ethylene/1-butene mixed gas (ethylene: 73% by mol, 1-butene: 27% by mol) were fed to the system so that the total pressure became 7 kg/cm². The polymerization was carried out at 50° C. for 7 minutes, while keeping the total pressure at 7 kg/cm² by continuous feeding the mixed gas. After the reaction was completed, the pressure was released to atmospheric pressure, giving 148 g of a white powdery polymer.

The propylene homopolymer obtained in the first stage had a melting point of 161° C. and MFR of 13.5 g/10 min. The propylene-ethylene copolymer obtained in the second stage had a propylene content of 59% by mol and an intrinsic viscosity [η] of 3.8 dl/g. The ethylene-1-octene copolymer obtained in the third stage had an ethylene content of 80% by mol and an intrinsic viscosity [η] of 2.4 dl/g. The ethylene-1-butene copolymer obtained in the fourth stage had an ethylene content of 93% by mol and an intrinsic viscosity [η] of 1.7 dl/g.

The resulting propylene polymer composition contained the propylene homopolymer in an amount of 71.1% by weight, the propylene-ethylene copolymer in an amount of 7.6% by weight, the ethylene-1-octene copolymer in an amount of 13.1% by weight and the ethylene-1-butene copolymer in an amount of 8.2% by weight, and had MFR of 12 g/10 min, IZ at 23° C. of 45 kg·cm/cm, IZ at −30° C. of 5.5 kg·cm/cm, FM of 14,000 kg/cm², EL of 550% and HDT of 105° C.

EXAMPLE 8

[Polymerization]

A 2-liter stainless steel autoclave was chaged with 500 g of propylene and 0.8 liter of hydrogen at room temperature, and the temperature was elevated to 40° C. Then, 0.5 mmol of triisobutylaluminum and 0.004 mmol (in terms of zirconium atom) of the solid catalyst component (b-2) prepared in Example 4 were added, and the polymerization was carried out at 50° C. for 25 minutes.

Subsequently, the internal pressure was released to atmospheric pressure, and nitrogen was passed through the system for about 10 minutes to purge the system. During this procedure, 4.3 g of a polymer produced was taken out of the system by means of a specially devised sampler.

Then, an ethylene/propylene mixed gas (ethylene: 20% by mol, propylene: 80% by mol) was fed to the system so that the total pressure became 7 kg/cm². The polymerization was carried out at 50° C. for 10 minutes, while keeping the total pressure at 7 kg/cm² by continuous feeding the mixed gas.

After the internal pressure was released, 4.8 g of a polymer produced was taken out of the system while purging with nitrogen in the manner as described above. Thereafter, 0.25 mmol of triisobutylaluminum and 140 ml of 1-octene were added to the system, and ethylene was further fed so that the total pressure became 7 kg/cm². The polymerization was carried out at 80° C. for 30 minutes, while keeping the total pressure at 8 kg/cm² by continuous feeding ethylene.

After the internal pressure was released, 5.1 g of a polymer produced was taken out of the system while purging with nitrogen in the manner as described above. Thereafter, 30 ml of 1-butene was fed, and ethylene was further fed so that the total pressure became 8 kg/cm². The polymerization was carried out at 80° C. for 15 minutes, while keeping the total pressure at 8 kg/cm² by continuous feeding ethylene. After the reaction was completed, the pressure was released to atmospheric pressure, giving 161 g of a white powdery polymer.

The propylene homopolymer obtained in the first stage had a melting point of 156° C. and MFR of 6.0 g/10 min. The propylene-ethylene copolymer obtained in the second stage had a propylene content of 59% by mol and an intrinsic viscosity [η] of 2.0 dl/g. The ethylene-1-octene copolymer obtained in the third stage had an ethylene content of 83% by mol and an intrinsic viscosity [η] of 2.8 dl/g. The ethylene-1-butene copolymer obtained in the fourth stage had an ethylene content of 92% by mol and an intrinsic viscosity of 3.0 dl/g.

The resulting propylene polymer composition contained the propylene homopolymer in an amount of 73% by weight, the propylene-ethylene copolymer in an amount of 12% by weight, the ethylene-1-octene copolymer in an amount of 7% by weight and the ethylene-1-butene copolymer in an amount of 8% by weight, and had MFR of 38 g/10 min, IZ at 23° C. of 35 kg·cm/cm, IZ at −30° C. of 4.2 kg·cm/cm, FM of 12,800 kg/cm², EL of 320% and HDT of 102° C.

What is claimed is:

1. A process for preparing a propylene polymer composition comprises:

conducting multistage polymerization including the following steps (a), (b), (d) and (e) in the presence of
   (A) a transition metal compound containing a ligand having a cyclopentadienyl skeleton represented by the following formula (III)

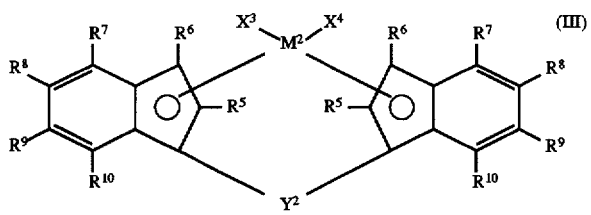

wherein $M^2$ is a transition metal atom of group IVB to group VIB of the periodic table;

$R^5$, $R^6$ and $R^8$ to $R^{10}$, which may be the same or different, are each a hydrogen, a halogen, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group;

$R^7$ is an aryl group of 6 to 16 carbon atoms;

$y^2$ is a divalent hydrocarbon group of 1 to 20 carbon atoms, a divalent halogenated hydrocarbon group of 1 to 20 carbon atoms, a divalent silicon-containing group or a divalent germanium-containing group; and $X^3$ and $X^4$ are each a hydrogen, a halogen, a hydrocarbon group of 1 to 20 carbon atoms, a halogenated hydrocarbon group of 1 to 20 carbon atoms, an oxygen-containing group or a sulfur-containing group, and (B) a compound activating the transition metal compound (A), in which the steps (a), (b), (d) and (e) are carried out in any order, and each of the second and subsequent stage polymerizations is carried out in the presence of a polymer or polymers obtained in the preceding stage or stages, respectively, to produce a propylene polymer composition comprising 20 to 85% by weight of a propylene (co)polymer (a) obtained in the step (a), 5 to 75% by weight of a propylene/olefin copolymer (b) obtained in the step (b), 5 to 75% by weight of an ethylene/olefin copolymer (d) obtained in the step (d) and 5 to 30% by weight of an ethylene/olefin copolymer (e) obtained in the step (e), said composition having a melt flow rate, as measured at 230° C. under a load of 2.16 kg, of 0.01 to 500 g/10 min;

the step (a):

(i) homopolymerizing propylene or (ii) copolymerizing propylene and at least one olefin selected from ethylene and olefins of 4 to 20 carbon atoms to prepare a propylene (co)polymer (a) comprising not less than 80 mol % of constituent units derived from propylene, said propylene (co)polymer (a) having a melting point, as measured by a differential scanning calorimeter, of not lower than 100° C. and a melt flow rate, as measured at 230° C. under a load of 2.16 kg, of 0.01 to 1,000 g/10 min;

the step (b):

copolymerizing propylene and at least one olefin selected from ethylene and olefins of 4 to 20 carbon atoms to prepare a propylene/olefin copolymer (b) comprising more than 50 mol % of constituent units derived from propylene, said propylene/olefin copolymer (b) having an intrinsic viscosity ($\eta$), as measured in decahydronaphthalene at 135° C., of 0.1 to 20 dl/g;

the step (d):

copolymerizing ethylene and at least one olefin selected from olefins of 3 to 20 carbon atoms to prepare an ethylene/olefin copolymer (d) comprising more than 50 mol % and less than 90 mol % of constituent units derived from ethylene, said ethylene/olefin copolymer (d) having an intrinsic viscosity ($\eta$), as measured in decahydronaphthalene at 135° C., of 0.1 to 20 dl/g; and the step (e):

copolymerizing ethylene and at least one olefin selected from olefins of 3 to 20 carbon atoms to prepare an ethylene/olefin copolymer (e) comprising not less than 90 mol % of constituent units derived from ethylene, said ethylene/olefin copolymer (e) having an intrinsic viscosity ($\eta$), as measured in decahydronaphthalene at 135° C., of 0.1 to 20 dl/g.

2. The process for preparing a propylene polymer composition as claimed in claim 1, wherein the multistage polymerization is carried out in the order of the step (a), the step (b), the step (d) and the step (e).

3. The process for preparing a propylene polymer composition as claimed in claim 2, wherein propylene is homopolymerized in the step (a), propylene is copolymerized with 1-butene in the step (b), ethylene is copolymerized with propylene in the step (d) and ethylene is copolymerized with 1-butene in the step (e).

4. The process for preparing a propylene polymer composition as claimed in claim 3, wherein propylene is homopolymerized in the step (a), propylene is copolymerized with ethylene in the step (b), ethylene is copolymerized with propylene in the step (d) and ethylene is copolymerized with 1-butene in the step (e).

5. The process for preparing a propylene polymer composition as claimed in any one of claims 2, 3, 4, or 1 wherein the compound (B) activating the transition metal compound (A) is at least one compound selected from the group consisting of:

(B-1) an organoaluminum compound, (B-2) an organoaluminum oxy-compound, and (B-3) a compound which reacts with the transition metal compound (A) to form an ion pair.

6. A propylene polymer composition prepared according to the process as claimed in claim 1.

7. The process for preparing a propylene polymer composition as claimed in any one of claims 2, 3, 4 or 1, wherein each of $R^6$, $R_8$, $R^9$ and $R^{10}$ is hydrogen.

* * * * *